(12) United States Patent
Mallette et al.

(10) Patent No.: US 10,435,059 B2
(45) Date of Patent: Oct. 8, 2019

(54) SNOWMOBILE

(71) Applicant: BOMBARDIER RECREATIONAL PRODUCTS INC., Valcourt (CA)

(72) Inventors: Bertrand Mallette, Sherbrooke (CA); Pascal Gagnon, Sherbrooke (CA); Nicolas Bedard, Granby (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 15/570,503

(22) PCT Filed: May 2, 2016

(86) PCT No.: PCT/IB2016/052497
§ 371 (c)(1),
(2) Date: Oct. 30, 2017

(87) PCT Pub. No.: WO2016/174650
PCT Pub. Date: Nov. 3, 2016

(65) Prior Publication Data
US 2018/0141580 A1    May 24, 2018

Related U.S. Application Data

(60) Provisional application No. 62/155,408, filed on Apr. 30, 2015, provisional application No. 62/298,300, filed on Feb. 22, 2016.

(51) Int. Cl.
*B62B 17/06*   (2006.01)
*B62B 17/02*   (2006.01)
*B62M 27/02*   (2006.01)

(52) U.S. Cl.
CPC .............. *B62B 17/06* (2013.01); *B62B 17/02* (2013.01); *B62M 27/02* (2013.01); *B62M 2027/026* (2013.01)

(58) Field of Classification Search
CPC ........ B62B 17/06; B62B 17/02; B62M 27/02; B62M 2027/026
See application file for complete search history.

(56) References Cited

U.S. PATENT DOCUMENTS 7,712,557 B2   5/2010   Duceppe
9,061,732 B1   6/2015   Vezina
(Continued)

FOREIGN PATENT DOCUMENTS

CA        2441643 A1    4/2004

OTHER PUBLICATIONS

International Search Report of PCT/IB2016/052497; Shane Thomas; dated Aug. 31, 2016.

*Primary Examiner* — Joseph M Rocca
*Assistant Examiner* — Marlon A Arce
(74) *Attorney, Agent, or Firm* — BCF LLP

(57) ABSTRACT

Snowmobile having a suspension assembly comprising an upper A-arm, a lower A-arm, and a ski leg. The ski leg is pivotably connected to the upper A-arm via an upper A-arm connector and to the lower A-arm via a lower A-arm connector and is pivotable about a kingpin axis. A ski is connected to the ski leg via a ski connector. The upper A-arm connector, the lower A-arm connector and the ski connector are positioned one with respect to the others such that the kingpin axis is behind the ski connector at a level of the ski connector when the ski is viewed from the side.

18 Claims, 16 Drawing Sheets

(56) References Cited

U.S. PATENT DOCUMENTS

| | | |
|---|---|---|
| 2005/0103547 A1 | 5/2005 | Mallette et al. |
| 2008/0173491 A1 | 7/2008 | Fecteau |
| 2010/0140007 A1 | 6/2010 | Ogura et al. |
| 2011/0115180 A1* | 5/2011 | Polakowski ............. B60G 7/02 280/86.751 |
| 2013/0032417 A1* | 2/2013 | Sampson ............... B62M 27/02 180/182 |
| 2017/0129570 A1* | 5/2017 | Mangum ................ B62M 27/02 |
| 2017/0217540 A1* | 8/2017 | Sawai ..................... B62B 13/06 |
| 2017/0247084 A1* | 8/2017 | Vezina ................... B62M 27/02 |

* cited by examiner

SNOWMOBILE

CROSS-REFERENCE

The present application claims priority to U.S. Provisional Patent Application No. 62/155,408, filed Apr. 30, 2015, entitled "Snowmobile" and to U.S. Provisional Patent Application No. 62/298,300, filed Feb. 22, 2016, entitled "Snowmobile". Each of the foregoing applications is incorporated herein by reference in its entirety.

FIELD OF TECHNOLOGY

The present technology relates to snowmobiles.

BACKGROUND

Conventional snowmobiles are designed to be operated across a wide variety of terrain types and operating environments. As is known in the art, snowmobiles are generally ridden in an active manner and, as such, the operator of the snowmobile typically moves his or her body during riding to influence the course of travel of the snowmobile. For example, during most types of turns snowmobile operators typically move their position on the snowmobile so as to shift their weight to the inside of the turn, while simultaneously steering the vehicle in the direction of the turn. There are, however, some types of snowmobile turning operations, such as during side-hilling or boon-docking, which require the operator to counter-steer the snowmobile. When a snowmobile is counter-steered, the handlebars are steered in a direction opposite to the direction of the turn. While current snowmobile design is adequate for counter-steering to occur, it can sometimes be more difficult than would be desirable.

SUMMARY

It thus is an object of the present technology to ameliorate at least one of the inconveniences present in the prior art.

It is a further object of the present technology to, at least in some instances and in some respects, provide for a snowmobile having improved counter-steerability, at least as compared with some of the prior art snowmobiles.

For many vehicles, the vehicle is steered by turning a steerable ground-engaging member (e.g. a wheel, ski, track, etc.—as the case may be, depending on the type of vehicle in question) with respect to the ground surface over which the vehicle is travelling. In such cases, the "steering axis" of the steerable ground-engaging member is the axis about which the member turns in response to steering input to steer the vehicle. The "load axis" of the member is the representational gravitation force vector through which the mass of the vehicle is exerted upon the ground surface contacted by the member. The "caster" or "trail" (the terms being used interchangeably in the art) of such a steerable ground-engaging member is a measure of how far forward or behind the steering axis of that member is the load axis of that member, with respect to the ground surface.

The concepts of "steering axis", "load axis", and "caster"/"trail" are illustrated FIGS. 1A, 1B, and 1C in a simplified manner using a wheel (with a tire) as a steerable ground engaging member. In FIG. 1A, the wheel 010a is attached to a vehicle (not shown) via a suspension 014a which effects turning of the wheel 010a about a steering axis 016a. The steering axis 016a contacts the ground surface 020 at a point 024a. The load axis 018a through which the wheel 010a supports the load of the vehicle (via the suspension 014a) contacts the ground surface 020 at a point 026a. The front of the vehicle and thus forward motion of the vehicle is shown by arrow 012a. As the steering axis/ground contact point 024a is forward of the load axis/ground contact point 026a, the wheel 010a illustrated in FIG. 1A is said to have "positive caster" or "positive trail", 022a.

In FIG. 1B, the wheel 010b is attached to a vehicle (not shown) via a suspension 014b which effects turning of the wheel 010b about a steering axis 016b. The steering axis 016b contacts the ground surface 020 at a point 024b. The load axis 018b through which the wheel 010b supports the load of the vehicle (via the suspension 014b) contacts the ground surface 020 at a point 026b. The front of the vehicle and thus forward motion of the vehicle is shown by arrow 012b. As the steering axis/ground contact point 024b is the same point as the load axis/ground contact point 026b, the wheel 010b illustrated in FIG. 1B is said to have "neutral caster" or "neutral trail", 022b.

In FIG. 1C, the wheel 010c is attached to a vehicle (not shown) via a suspension 014c which effects turning of the wheel 010c about a steering axis 016c. The steering axis 016c contacts the ground surface 020 at a point 024c. The load axis 018c through which the wheel 010c supports the load of the vehicle (via the suspension 014c) contacts the ground surface 020 at a point 026c. The front of the vehicle and thus forward motion of the vehicle is shown by arrow 012c. As the steering axis/ground contact point 024c is rearward of the load axis/ground contact point 026c, the wheel 010c illustrated in FIG. 1C is said to have "negative caster" or "negative trail", 022c.

(It should be understood, that, as was stated above, FIGS. 1A, 1B, and 1C are simplifications that have been created for the purpose of facilitating understanding of the present technology. In this regard, in each of the FIGS. 1A, 1B, and 1C, the steering axis 016a, 016b, and 016c (respectively) and the load axis 018a, 018b, and 018c (respectively) of each wheel 010a, 010b, and 010c (respectively) are coplanar. As would be understood by those of ordinary skill in the art, each of these wheels 010a, 010b, and 010c thus has what is known in the art as a neutral or zero "camber". Camber is the angle between the steering axis of a wheel and the longitudinal center plane of the vehicle when the vehicle is viewed from the front or the rear. A wheel has neutral or zero camber when the top of the wheel and the bottom of the wheel are equidistant from the longitudinal center plane of the vehicle. A wheel has positive camber when the top of the wheel is further out from the longitudinal center plane of the vehicle than the bottom of the wheel. A wheel has negative camber when the bottom of the wheel is further out from the longitudinal center plane of the vehicle than the top of the wheel. In the context of the present technology the camber of a ski is generally immaterial, and will be assumed to be zero unless otherwise stated herein.)

Conventionally, automobiles (and almost all other vehicles) are designed such their steerable ground-engaging members (e.g. the front wheels in the case of automobiles) have a positive trail. This is the case because when such a vehicle is moving forward, the positive trail of its steerable ground-engaging members will cause the vehicle's steering to self-center, as the load axis ground contact point trails the steering axis ground contact point. This positive trail makes the vehicle easier to drive and improves the vehicle's directional stability, reducing the vehicle's tendency to wander. Conventional snowmobiles are similarly designed such that their skis have positive trail for the same reasons.

The creators of the present technology have realized that in certain situations, including certain situations when counter-steering is required, having a snowmobile with a ski(s) having negative trail might be beneficial. This is theorized to be because in situations where a snowmobile's ski(s) have negative trail, the snowmobile's directional stability would be decreased and its tendency to wander would be increased. These effects of having negative trail could be exploited to assist the snowmobile in counter-steering and turning, at least in some situations such as in some when counter-steering is required.

The creators of the present technology have also realized that in many instances when counter-steering is required, the snowmobile operator is positioned into a turn, and the snowmobile itself is tilted in the direction of the turn. (Thus, for example, a snowmobile operator, in side-hilling where the mountain is on the right side of the snowmobile's forward motion, positions his or her body to the right and counter-steers to the left. The snowmobile (when viewed from behind, with respect to a horizontal plane perpendicular to gravity), is tilted toward the right, inward toward the mountain, while the skis are steered left.). When the snowmobile is tilted as described above, the load axis tilts as well (with respect to the vertical central longitudinal plane of the vehicle or its skis), as the load axis is always parallel to gravity. The steering axis however, is unaffected by the tilting of the snowmobile per se, and remains the same. Thus, the relationship between the steering axis and the load axis will change when the snowmobile is tilted as described above. The present technology exploits such a change.

In embodiments of the present technology, the snowmobile and its component parts are constructed and arranged such that the relationship of the steering axis and the load axis of a snowmobile ski is such that when the snowmobile is tilted as described above, the inner snowmobile ski (with respect to the tilt/turn) has a negative trail. Having a negative trail in such an instance should generally make counter-steering easier to execute than having a positive trail, as the directional stability should be decreased and the snowmobile ski should naturally "want" to turn.

In some embodiments, the snowmobile and its components parts are also constructed and arranged such that the relationship of the steering axis and the load axis of a snowmobile ski is such that when the snowmobile is not tilted as described above (e.g. is travelling forward over flat packed snow), the snowmobile skis have a positive trail. Thus, in such instances, the directional stability is enhanced, via the snowmobile having skis that have positive trail, as is typically the case. Some embodiments of the present technology thus provide a snowmobile with a ski having negative trail in some instances where negative trail would potentially be beneficial but also having positive trail in some other instances where positive trail would potentially be beneficial.

Thus, according to one aspect of the present technology, embodiments of the present technology provide a snowmobile comprising a frame. An engine is disposed on the frame. A drive track is disposed below the frame and is connected operatively to the engine for propulsion of the snowmobile. A seat is disposed on the frame above the drive track and rearward of the engine. A front left suspension assembly and a front right suspension assembly are disposed on the frame. Each suspension assembly includes an upper A-arm, a lower A-arm, and a ski leg. The ski leg is pivotably connected to the upper A-arm via an upper A-arm connector and to the lower A-arm via a lower A-arm connector and is pivotable about a kingpin axis. A ski is connected to the ski leg via a ski connector. The upper A-arm connector, the lower A-arm connector and the ski connector are positioned one with respect to the others such that the kingpin axis is behind the ski connector in a plane passing through the ski connector's central axis parallel to the ground when the snowmobile is steered straight on flat level terrain were the ski to have zero camber, when the ski is viewed from a side. (As would be understood by one of ordinary skill in the art, in an A-arm type suspension, the kingpin axis about which the ski leg pivots is the steering axis of the ski connected to that ski leg. In the context of the present specification, the expression "... were the ski to have zero camber ... " should not be understood as requiring that any particular ski in question actually has zero camber, this is not the case. This expression is used in this specification to help in defining particular references plane(s) on a particular ski. Where a particular ski in question has a non-zero camber, a reference plane (if the definition thereof uses that expression) is defined by notionally reorienting the ski to have zero camber, defining the referencing plane, and then reorienting the ski and reference plane to actual camber of that particular ski in question.)

Constructing and arranging (e.g. positioning) the ski leg, the upper A-arm connector, the lower A-arm connector, the ski connector and the ski such that the kingpin axis is behind the ski connector at a level of the ski connector when the ski is viewed from a side will, in some circumstances when the snowmobile is tilted in a tilt direction, result in the then ground-engaging snowmobile ski then having a negative trail. It will also, in some such circumstances result in a lateral component of the load axis creating a moment about the kingpin axis tending to rotate the ski in a turning direction opposite the tilt direction (e.g. if tilt direction is toward the left, then the turning direction would be towards the right). Both of these conditions, may assist the snowmobile operating in counter-steering the snowmobile, which is desirable under such circumstances.

In some such embodiments, the upper A-arm connector, the lower A-arm connector and the ski connector are further positioned one with respect to the others such that an intersection of the load axis of the ski with a bottom of the ski is behind an intersection of the kingpin axis with the bottom of the ski when the ski is viewed from the side when the snowmobile is steered straight on flat level terrain.

Constructing and arranging (e.g. positioning) the ski leg, the upper A-arm connector, the lower A-arm connector, the ski connector and the ski such that an intersection of a load axis of the ski with a bottom of the ski is behind an intersection of the kingpin axis with the bottom of the ski when the ski is viewed from the side when the snowmobile is steered straight on flat level terrain will, when the snowmobile is not tilted (i.e. running with both skis on flat level ground), result in the skis then having a positive trail, which, as was discussed hereinabove, is generally desirable under such circumstances.

In some embodiments, the kingpin axis is behind the ski connector by a first distance, in a plane passing through the ski connector central axis parallel to the ground when the snowmobile is steered straight on flat level terrain were the ski to have zero camber, when the ski is viewed from a side. The intersection of the load axis of the ski with the bottom of the ski is behind the intersection of the kingpin axis with the bottom of the ski by a second distance when the ski is viewed from the side when the snowmobile is steered straight on flat level terrain. The first distance is less than the second distance. Thus, in such embodiments, the snowmobile skis generally experience more positive trail (when they are experiencing positive trail) than negative trail (when they are experiencing negative trail as described herein).

In some embodiments, the ski has a ski longitudinal center plane defined by the plane containing the longitudinal axis of the ski perpendicular to the ground when the snowmobile is steered straight on flat level terrain were the ski to have zero camber. The ski also has a ski runner secured to the ski via a forward threaded bolt having a forward bolt central axis and a rearward threaded bolt having a rearward bolt central axis. A forward bolt plane is defined by the plane containing the forward bolt central axis perpendicular to the ski longitudinal center plane. A rearward bolt plane defined by the plane containing the rearward bolt central axis perpendicular to the ski longitudinal center plane. A kingpin intersection plane, containing the intersection of the kingpin axis and the plane passing through the ski connector central axis parallel to the ground when the snowmobile is steered straight on flat level terrain were the ski to have zero camber, perpendicular to the ski longitudinal center plane, is between the forward bolt plane and the reward bolt plane between the plane passing through the ski connector's central axis parallel to the ground and the ground. A load axis intersection plane, containing the intersection of the load axis of the ski with the bottom of the ski when the snowmobile is steered straight on flat level terrain, perpendicular to the ski longitudinal center plane is between the forward bolt plane and the reward bolt plane between the plane passing through the ski connector's central axis parallel to the ground and the ground.

In some embodiments, the ski has a ski longitudinal center plane defined by the plane containing a longitudinal axis of the ski perpendicular to the ground when the snowmobile is steered straight on flat level terrain were the ski to have zero camber. The ski has a ski runner secured to the ski via a forward threaded bolt having a forward bolt central axis and a rearward threaded bolt having a rearward bolt central axis. At least one of the forward bolt central axis and the rearward bolt central axis lies within the longitudinal center plane of the ski.

In some embodiments, the ski has a ski longitudinal center plane defined by the plane containing a longitudinal axis of the ski perpendicular to the ground when the snowmobile is steered straight on flat level terrain were the ski to have zero camber. A point of intersection of (i) the plane passing through the ski connector's central axis and parallel to the ground when the snowmobile is steered straight on flat level terrain were the ski to have zero camber when the ski is viewed from a side, and (ii) the king pin axis, is laterally outward from the ski longitudinal center plane.

For purposes of this application terms related to spatial orientation such as forward, rearward, left, and right, are as they would normally be understood by an operator of the vehicle sitting thereon in a normal operating position.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
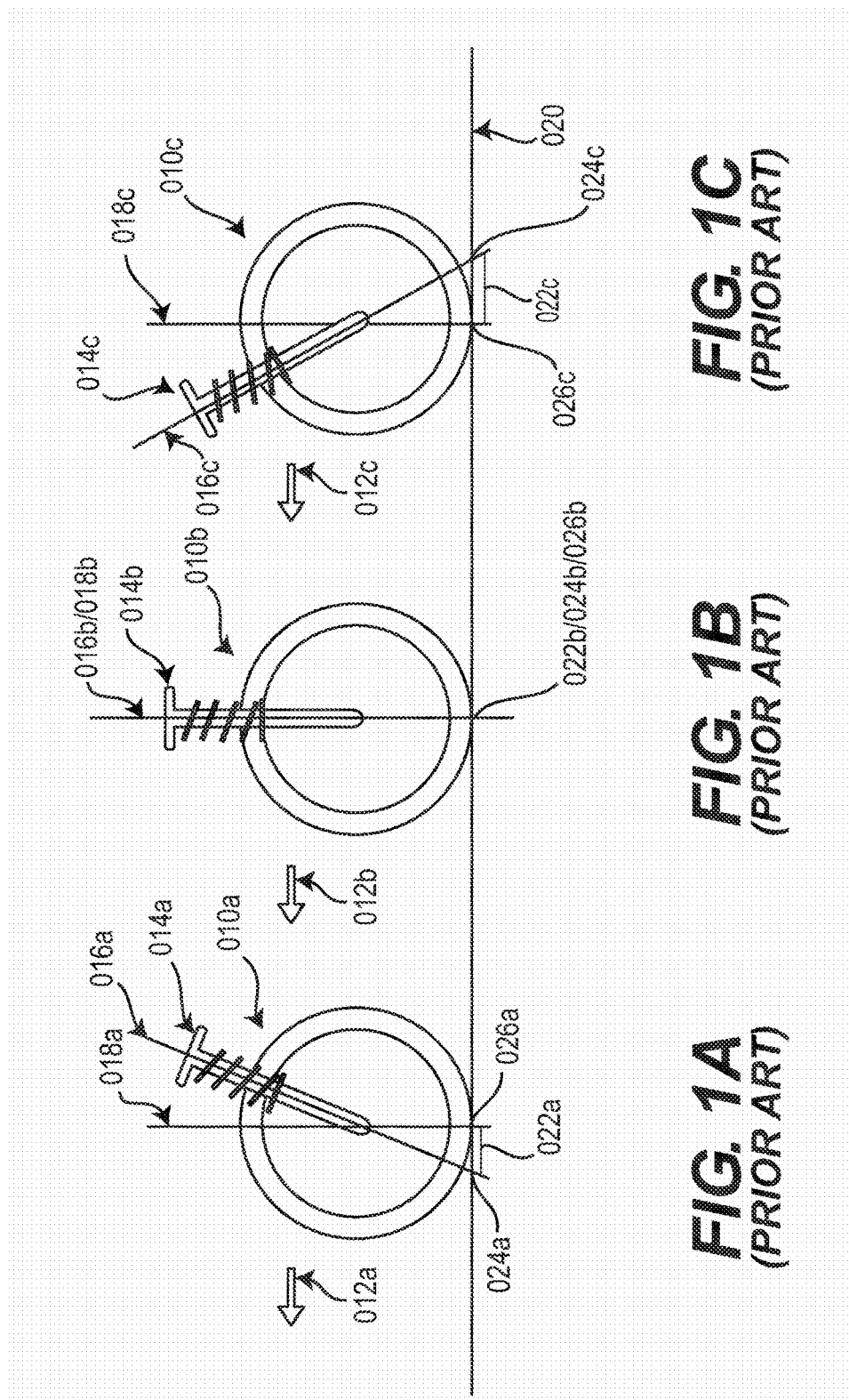
FIGS. 1A, 1B, and 1C are graphical representations illustrating positive caster, neutral caster, and negative caster, respectively.
Figure 2:
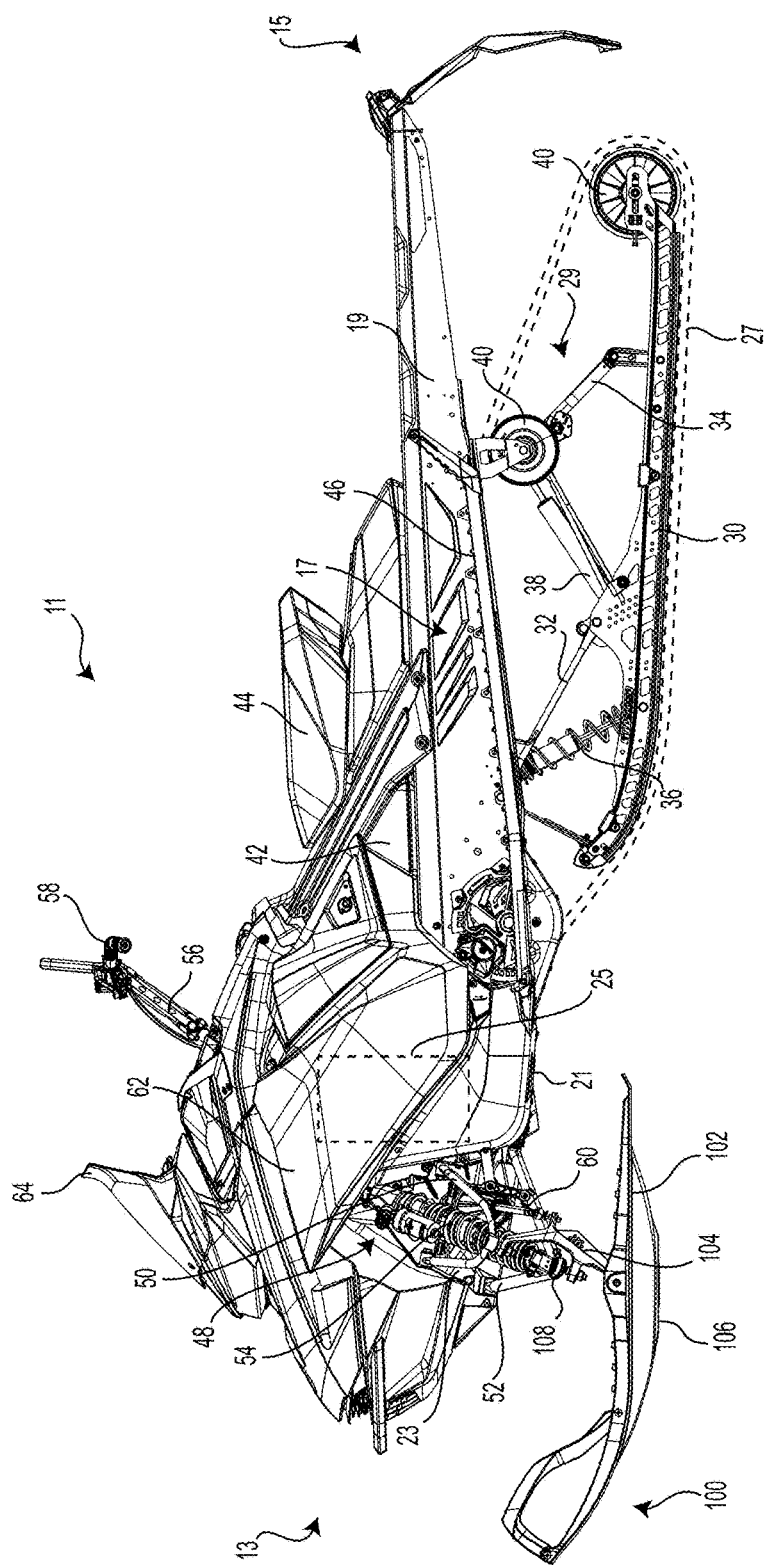
FIG. 2 is a left side elevation view of a snowmobile being a first embodiment of the present technology.

Referring to FIG. 2, there is shown snowmobile 11, being an embodiment of the present technology. The snowmobile 11 has a front end 13 and a rear end 15, which are defined consistently with the forward travel direction of the snowmobile 11. The snowmobile 11 includes a frame 17. The frame 17 includes a tunnel 19, a motor cradle portion 21 and a front suspension assembly portion 23. A motor 25, which is schematically illustrated in FIG. 2, is supported by the motor cradle portion 21. In the present embodiment, the motor 25 is a four-stroke, two-cylinder, internal combustion engine. However, it is contemplated that other types of motors could be used such as, but not limited to, an electric motor or a two-stroke internal combustion engine.

An endless drive track 27 is disposed under the tunnel 19. The endless drive track 27 is operatively connected to the engine 25 through a continuously variable transmission (CVT, not shown). The endless drive track 27 is suspended for movement relative to the frame 17, by a rear suspension assembly 29. The rear suspension assembly 29 includes a pair of spaced apart slide rails 30, rear suspension arms 32, 34 and shock absorbers 36, 38. The slide rails 30 engage the inner side of the endless drive track 27. The rear suspension arms 32, 34 and the shock absorbers 36, 38 pivotally connect the tunnel 19 to the slide rails 30. The endless drive track 27 is driven to run about the rear suspension assembly 29 for propulsion of the snowmobile 11. A plurality of rollers 40 cooperate in defining the path about which the endless drive track 27 travels.

A fuel tank 42 is supported on top of the tunnel 19. A seat 44 is disposed on the fuel tank 42 and is adapted to support a rider. Two footrests 46 (only one of which is shown) are positioned on opposite sides of the tunnel 19 below the seat 44 to support the rider's feet. The footrests 46 are integrally formed with the tunnel 19.

Left and right ski assemblies 100 are positioned at a front of the snowmobile 11 (only one of which is shown in FIG. 2). Each ski assembly 100 includes a ski 102, a corresponding ski leg 104 and other components that will be described in greater detail below. Each ski assembly 100 is attached to the front suspension assembly portion 23 of the frame 17 via a front suspension assembly 48. Each front suspension assembly 48 includes an upper A-arm 50, a lower A-arm 52 and a shock absorber 54. Each ski leg 104 is pivotally connected to its corresponding upper and lower A-arms 50, 52 and a corresponding shock absorber 54 is connected between the lower A-arm 52 and the front suspension assembly portion 23 of the frame 17. It is contemplated that other types of front suspension assemblies could be used. It is contemplated that the snowmobile 11 could have only one ski assembly 100.

A steering assembly including a steering column 56 and handlebar 58 is supported by the frame 17. The steering column 56 is attached at its upper end to the handlebar 58, which is positioned forward of the seat 44. The steering column 56 is operatively connected to the ski legs 104 by steering rods 60 in order to steer the skis 102, and thereby the snowmobile 11, when the handlebar 58 is turned.

Fairings 62 enclose the engine 25 and the CVT, thereby providing an external shell that protects the engine 25 and CVT. The fairings 62 include a hood and one or more side panels that can be opened to allow access to the engine 25 and the CVT when this is required, for inspection or maintenance of the engine 25 and/or the CVT for example. A windshield 64 is connected to the fairings 62 forward of the handlebar 58. It is contemplated that the windshield 64 could be attached directly to the handlebar 58.

Figure 3:
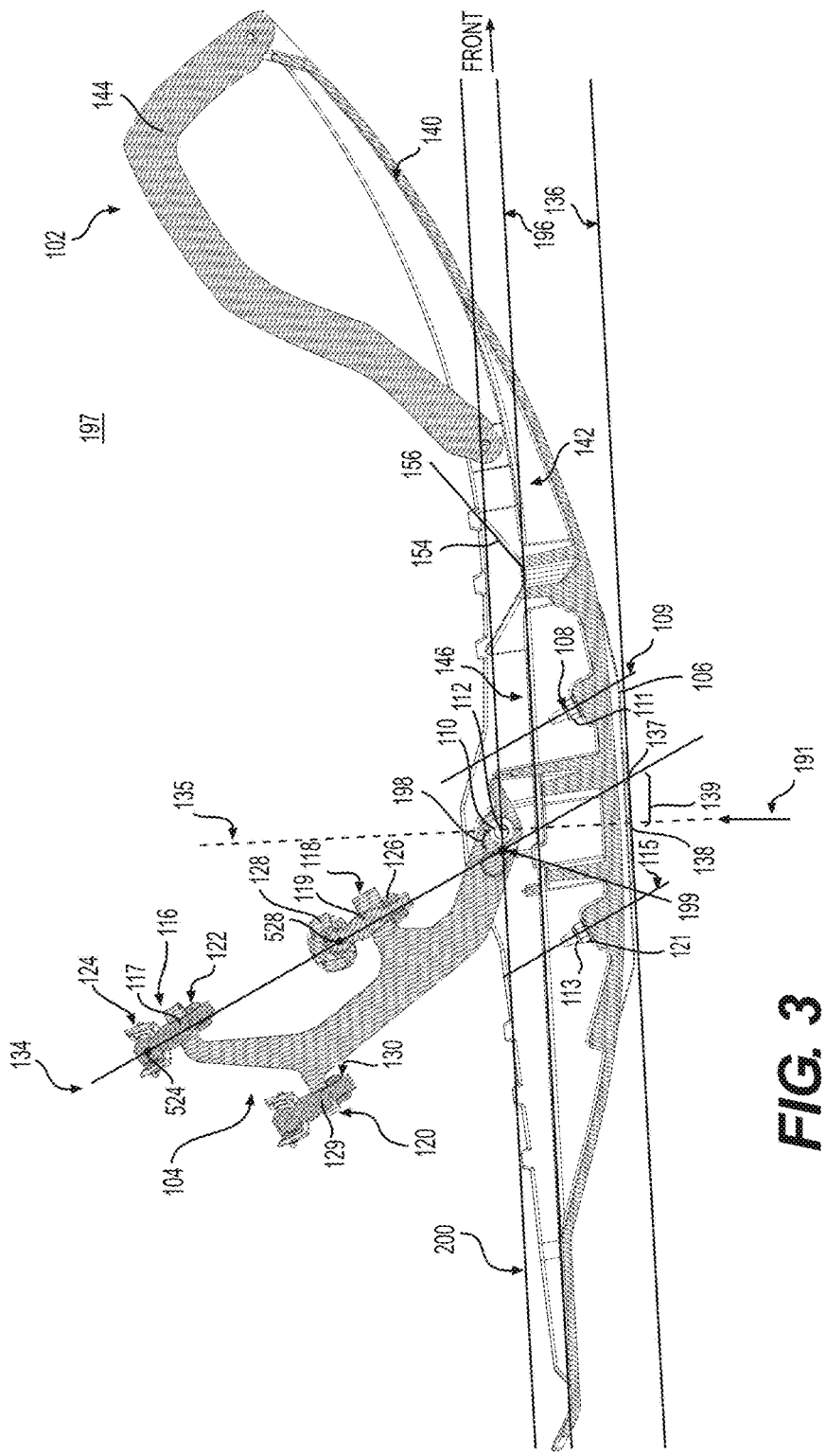
FIG. 3 is a cross sectional view of a portion of a ski and suspension assembly of the snowmobile of FIG. 2.
Figure 4:
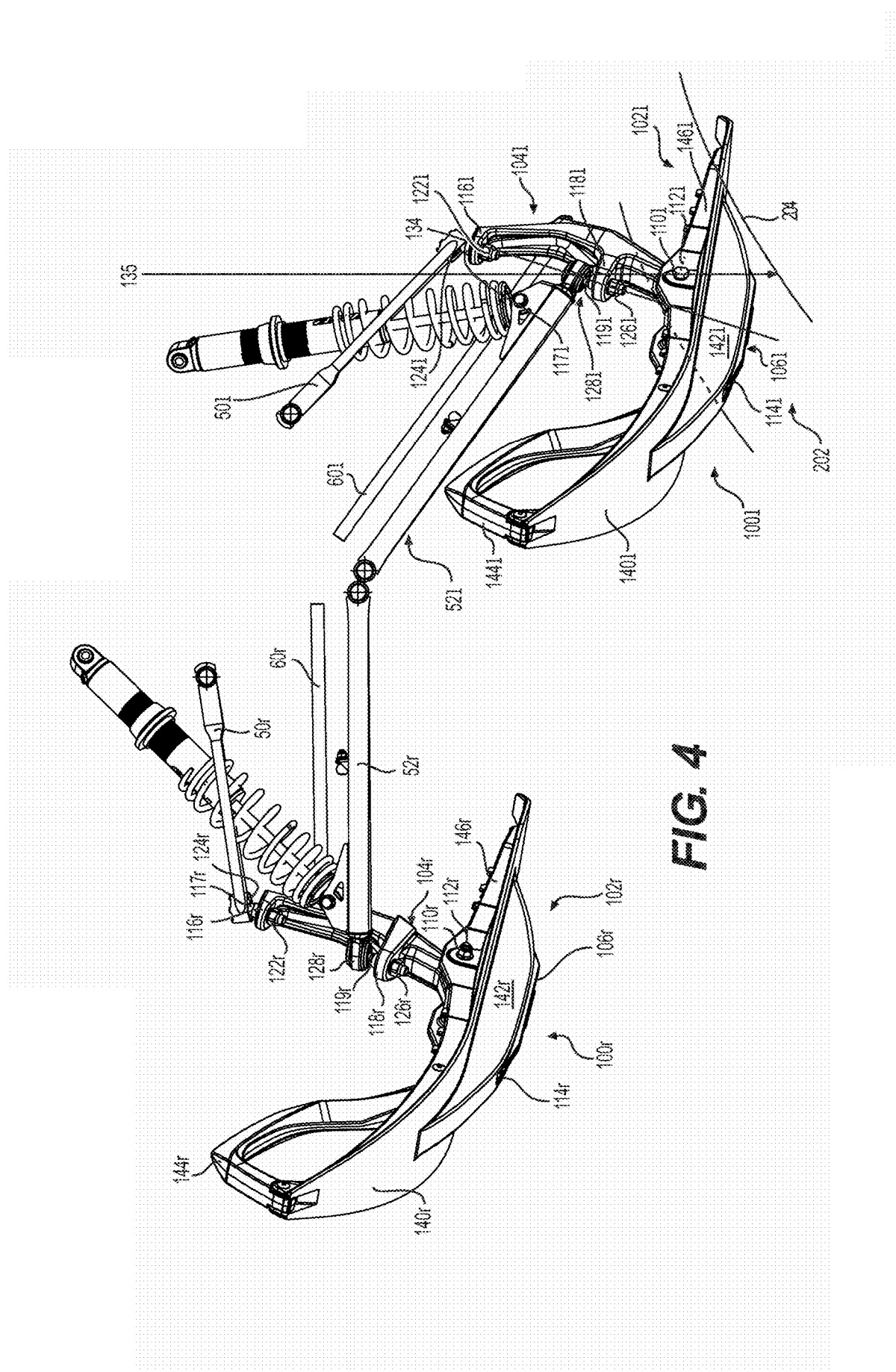
FIG. 4 is a front elevation view of the ski and suspension assemblies of the snowmobile of FIG. 2, with the skis turned to execute a counter-steering manoeuvre.
Figure 6:
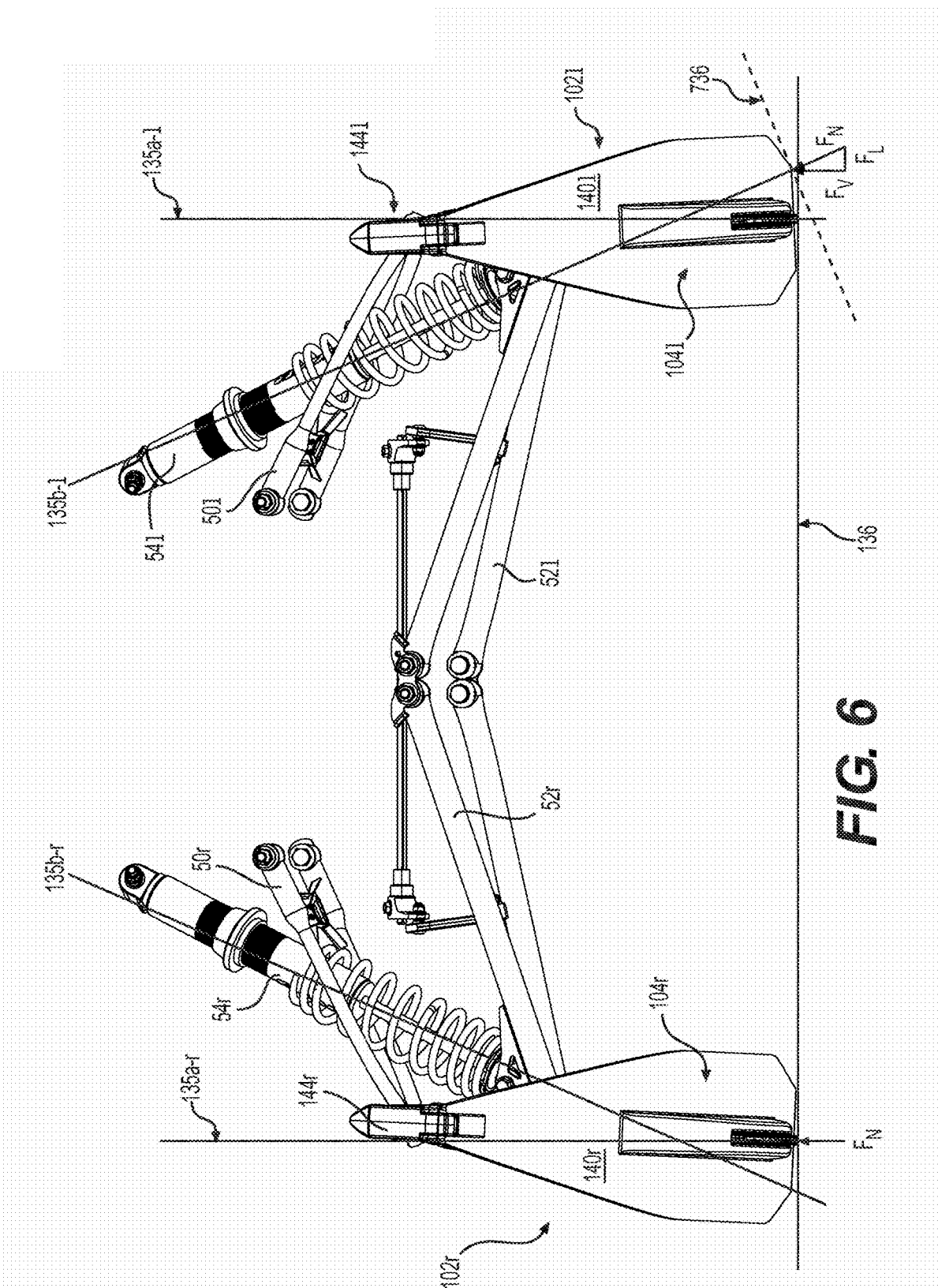
FIG. 6 is a front elevation view of the ski and suspensions assemblies of the snowmobile of FIG. 2, with the skis steered straight.

Turning now to FIGS. 3, 4, and 6 the left and right ski and suspension assemblies 100 (100l, 100r respectively—in the description that follows the "l" and "r" used in the Figures after the reference number in some places to indicate "left" and "right" respectively have been omitted for ease of reading in some places) of the snowmobile 11 will be described. In the present embodiment, the left and right ski and suspension assemblies are mirror images of one another and thus will not be separately described. (In other embodiments this is not the case.) Ski and snowmobile assembly 100 includes ski 102, the ski leg 104, and ski runner 106.

The ski 102 is pivotally connected to a bottom of the ski leg 104 by a bolt 110 (or in other embodiments by another fastener). The bolt 110 has a bolt central axis 112 that defines a laterally extending ski pivot axis 112 about which the ski 102 pivots relative to the ski leg 104. The ski runner 106 is inserted into a slot 114 defined in the ski 102 and connected to the ski 102 via two bolts/nuts, a forward bolt 108 and nut 111 and a rearward bolt 113 and nut 121. The forward bolt 108 has a forward bolt central axis 109. The rearward bolt 113 has a rearward bolt axis 115. The slot 114 and the bolts 108, 113 stabilize the ski runner 106 and prevent rotation of the ski runner 106 relative to the ski 102.

As can be seen in FIGS. 3 and 6, when the snowmobile 11 is disposed on flat, level ground 136 and is steered straight ahead, such as when riding on an icy level surface, the ski assembly 100 is supported on the ground 136 by the ski runner 106 and the bottom of the ski 102 is spaced from the ground 136. Under these conditions, the weight (load) of the snowmobile 11 is distributed over a portion of the length of the ski runner 106. This weight distribution can be represented by a single resultant load passing through the ski leg 104, the bolt 110, the ski body 140, the bolt pivot axis 112, and the ski runner 106 to the ground 136, being resultant load axis 135 shown in the drawings. Load axis 135 intersects the ground at point 138.

Ski leg 104 has an upper front tab 116, a lower front tab 118, and a rear tab 120. A ball joint stud 117 is inserted through and connected to the upper front tab 116 by a nut 122 to connect the ski leg 104 to a ball joint 124 connected to the end of the upper A-arm 50. A ball joint stud 119 is inserted through and connected to the lower front tab 118 by a nut 126 to connect the ski leg 104 to a ball joint 128 connected to the end of the lower A-arm 52. A ball joint stud 129 is inserted through and connected to the rear tab 120 by a nut 130 to connect the ski leg 104 to a ball joint connected to the end of the steering rod 60. When the driver of the snowmobile 11 turns the handlebar 58, the steering rod 60 pushes or pulls, as the case may be, on the rear tab 120. As a result, the ski leg 104 pivots about a kingpin pivot axis (steering axis) 134 that passes through the centers 524, 528 (respectively) of the ball portions of the ball joint studs 117, 119 (respectively) of the ball joints 124, 128 (respectively).

As can be seen in FIG. 3, the ski leg 104 is constructed such that the centers of the ball joints, 124, 128 form the kingpin axis 134 such that in the plane passing through the central axis 112 of the bolt 110 (which connects the ski 102 to the ski leg 104) parallel to the ground 136 when the snowmobile is steered straight on flat level terrain were the ski 102 to have zero camber (the plane being shown as line 200), the kingpin axis 134 is behind the bolt 110 by a distance 198 when viewed from the side (the intersection of kingpin axis 134 and plane 200 is shown as point 199 in FIG. 3).

Further, as can also be seen in FIG. 3, the ski leg 104 is constructed such that an intersection of the load axis 135 of the ski 102 with a bottom of the ski 102 (shown as point 138) is behind an intersection of the kingpin axis 134 with the bottom of the ski 102 (shown as point 137) by a distance 139, when viewed from the side. Thus, when the ski is operated on flat level ground, the ski has a positive trail (caster). Distance 139 is greater in absolute value than distance 198.

A ski longitudinal center plane (not shown in the drawings) is defined by the plane containing a longitudinal axis of the ski perpendicular to the ground 136 when the snowmobile 11 is steered straight on flat level terrain, were the ski 102 to have zero camber. The cross-section of FIG. 3 is not exactly along the ski longitudinal center plane (because of the very slight camber of the ski), but for ease of understanding certain aspects of the present technology, in some instances hereinbelow, the cross-section of FIG. 3 may be taken as approximating one taken along the ski longitudinal center plane.

A forward bolt plane (coming in and out of the paper illustrating FIG. 3 vertically along line 109) is defined by the plane containing the forward bolt central axis 109 perpendicular to the ski longitudinal center plane. A rearward bolt plane (also coming in and out of the paper illustrating FIG.

3 vertically along line 115) is defined by the plane containing the rearward bolt central axis 115 perpendicular to the ski longitudinal center plane.

A kingpin intersection plane (coming in and out of the paper illustrating FIG. 3 vertically along line 134), containing the intersection 199 of the kingpin axis 134 and the plane 200 (passing through the bolt 110 central axis 112 parallel to the ground when the snowmobile is steered straight on flat level terrain, were the ski to have zero camber), perpendicular to the ski longitudinal center plane, is between the forward bolt plane (represented by line 109) and the rearward bolt plane (represented by line 115) between the plane 200 (passing through the bolt's 110 central axis 112 parallel to the ground 136) and the ground 136.

A load axis intersection plane (coming in and out of the paper illustrating FIG. 3 vertically along line 135), containing the intersection of the load axis 135 of the ski 102 with the bottom of the ski 136 when the snowmobile 11 is steered straight on flat level terrain, perpendicular to the ski longitudinal center plane were the ski to have zero camber, is between the forward bolt plane (represented by line 109) and the rearward bolt plane (represented by line 115) between the plane 200 (passing through the bolt's 110 central axis 112 parallel to the ground 136) and the ground 136.

Figure 5:
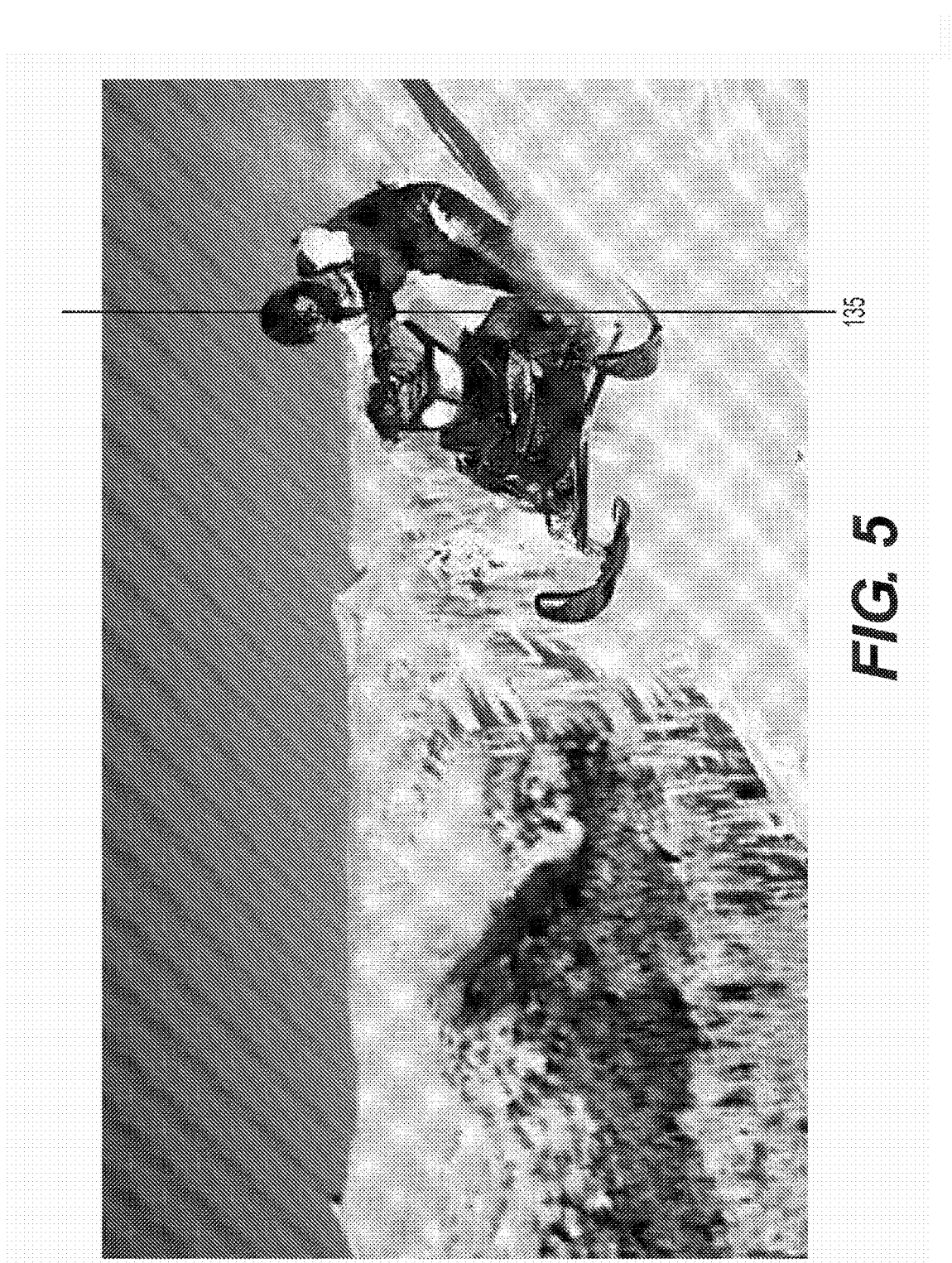
FIG. 5 is a picture of a snowmobile and snowmobile operator executing a side-hilling manoeuvre on a mountain.

In FIG. 5, there is shown a snowmobile operator executing what is known as "side-hilling" on a mountain. As can be seen in the figure during side-hilling the snowmobile operator has positioned his body on the inside of the turn (i.e. on the side of the snowmobile towards the uphill direction of the mountain) and he is executing what is effectively a left turn, such that the snowmobile is tilted inwards towards the mountain and is travelling in an accurate route. During side-hilling the snowmobile operator counter-steers the snowmobile and, as such, the skis in FIG. 5 are orientated with their tips outward from the mountain (or effectively in the position of a right-hand turn were the snowmobile on flat level hard-packed ground). Because of the tilt of the snowmobile, the load axis 135 of the sole ski in the picture contacting the ground has itself been re-oriented with respect to the ski (with respect to the longitudinal center plane of the ski) as shown in FIG. 5. As can be seen in FIG. 5, the load axis of the snowmobile no longer passes through the runner of the ski but now passes to the side of the runner of the ski. The kingpin axis, however, has not changed position with respect to the ski 102. Thus, turning to FIG. 3, when the snowmobile is side-hilling as in FIG. 5, the kingpin axis 134 is as shown exactly in FIG. 3 with respect to the ski 102. However, the load axis 135 is re-oriented with respect to the pin axis 112 of the bolt 110 such that it is effectively coming in and out of the plane of FIG. 3 at an angle.

This phenomenon is also illustrated in FIG. 4, which shows the ski and suspension assemblies 100 the snowmobile 11 of FIG. 5 executing the side-hilling manoeuvre. In FIG. 4 the snow of the mountain is represented by reference number 202 while the arcuate motion of the snowmobile is represented by the curves 204. Again, as can be seen in FIG. 4, the load axis 135 is re-oriented with respect to the bolt 110 (in view of the tilt of the snowmobile 11) and no longer exits though the runner 106 of the ski 102 but passes through the side of the ski. The ski leg 104 is constructed such when the load axis 135 is re-oriented with respect the ski 102 as shown in FIG. 4 due to the tilt of the snowmobile, the load axis 135 passes through the pin axis 112 in front of the king pin axis 134. Thus, in this position the snowmobile ski 102 has a negative trail, which assists in counter-steering the ski 102. (The relative positions of the load axis 135 and the ski 102 when the snowmobile 11 is on flat hard-packed ground 136 and when the snowmobile 11 is tilted during side-hilling are shown in FIG. 6, as 135a and 135b, respectively). As would be understood, the load axis 135a has only a vertical component with respect to ski 102 (which is shown in FIG. 6 with respect to load axis 135a-r, in respect of $F_N$— the ground force opposing the load axis). However, load axis 135b, has a vertical component and a lateral component with respect to ski 102 (which are shown in FIG. 6 with respect to load axis 135b-1, in respect of $F_N$— the ground force opposing the load axis, when broken into its components $F_V$ and $F_L$ respectively—the ground being shown as dotted line 736.)

With reference to FIGS. 3 & 4, the ski 102 includes a ski body 140, a keel 142 disposed on the bottom of the ski body 140, and a handle 144 connected to the upturned front portion of the ski body 140. The ski body 140 and the keel 142 are made of ultra-high molecular weight (UHMW) polyethylene. It is contemplated that the ski body 140 and the keel 142 could be made of other suitable materials.

As mentioned above, the front portion of the ski body 140 curves upwards. The middle and rear portions of the ski body 140, as seen from a side of the ski body 140, are generally flat except for a portion adjacent to the rear end that is angled upwards. As seen from above, the front and rear of the ski body 140 are tapered and the sides of the middle portion are parallel. It is contemplated that the ski body 140 could have a general shape other than as shown in the illustrated implementation. For example, the ski body 140 could have a sidecut or a flat rear end.

The ski body 140 has left and right longitudinally extending walls 146 extending upwards from an upper surface of the ski body 140. The walls 146 are laterally inwards of the lateral sides of the ski body 140. It is contemplated that the walls 146 could be disposed along the lateral sides of the ski body 140, and that they could extend more or less in the longitudinal direction than as shown in the illustrated implementation. The handle 144 is connected between the walls 146. Apertures (not shown) are defined in the walls 146 to receive the bolt 110 used to fasten the ski 102 to the ski leg 104.

FIGS. 7-16 relate to a second embodiment of the present technology, in which the ski 302 has a slight positive camber. The left and right ski and suspension assemblies 300 (300l, 300r respectively—in the description that follows the "l" and "r" used in the Figures after the reference number to indicate "left" and "right" respectively from time to time have been omitted for ease of reading in some places) will be described. In the present embodiment, the left and right ski and suspension assemblies are mirror images of one another and thus will not be separately described. Ski and snowmobile assembly 300 includes ski 302, the ski leg 304, and ski runner 306.

The ski 302 is pivotally connected to a bottom of the ski leg 304 by a bolt 310. The bolt 310 has a bolt central axis 312 that defines a laterally extending ski pivot axis about which the ski 302 pivots relative to the ski leg 304. The ski runner 306 is inserted into a slot 314 defined in the ski 302 and connected to the ski 302 via two bolts/nuts, a forward bolt 308 and nut 311 and a rearward bolt 313 and nut 321. The forward bolt 308 has a forward bolt central axis 309. The rearward bolt has a rearward bolt axis 315. The slot 314 and the bolts 308, 313 stabilize the ski runner 306 and prevent rotation of the ski runner 306 relative to the ski 302.

When a snowmobile is disposed on flat, level ground 336 and is steered straight ahead, such as when riding on an icy level surface, the ski assembly 300 is supported on the ground 336 by the ski runner 306 and the bottom of the ski 302 is spaced from the ground 336. Under these conditions, the weight (load) of the snowmobile is distributed over a portion of the length of the ski runner 306. This weight distribution can be represented by a single resultant load 335 passing through the ski leg 304, the bolt 310, the ski body 340, the bolt pivot axis 312, and the ski runner 306. Load axis 335 intersects the ground at point 338.

Ski leg 304 has an upper front tab 316, a lower front tab 318, and a rear tab 320. A ball joint stud 317 is inserted through and connected to the upper front tab 316 by a nut 322 to connect the ski leg 304 to a ball joint 324 connected to the end of the upper A-arm 250. A ball joint stud 319 is inserted through and connected to the lower front tab 318 by a nut 326 to connect the ski leg 304 to a ball joint 328 connected to the end of the lower A-arm 252. A ball joint stud 329 is inserted through and connected to the rear tab 320 by a nut 330 (to connect the ski leg 304 to a ball joint (not shown) connected to the end of the steering rod 260. When the driver of the snowmobile turns the handlebar, the steering rod 260 pushes or pulls, as the case may be, on the rear tab 320. As a result, the ski leg 304 pivots about a kingpin pivot axis (steering axis) 334 that passes through the centers 524, 528 of the ball joints 317, 319 (respectively).

Figure 7:
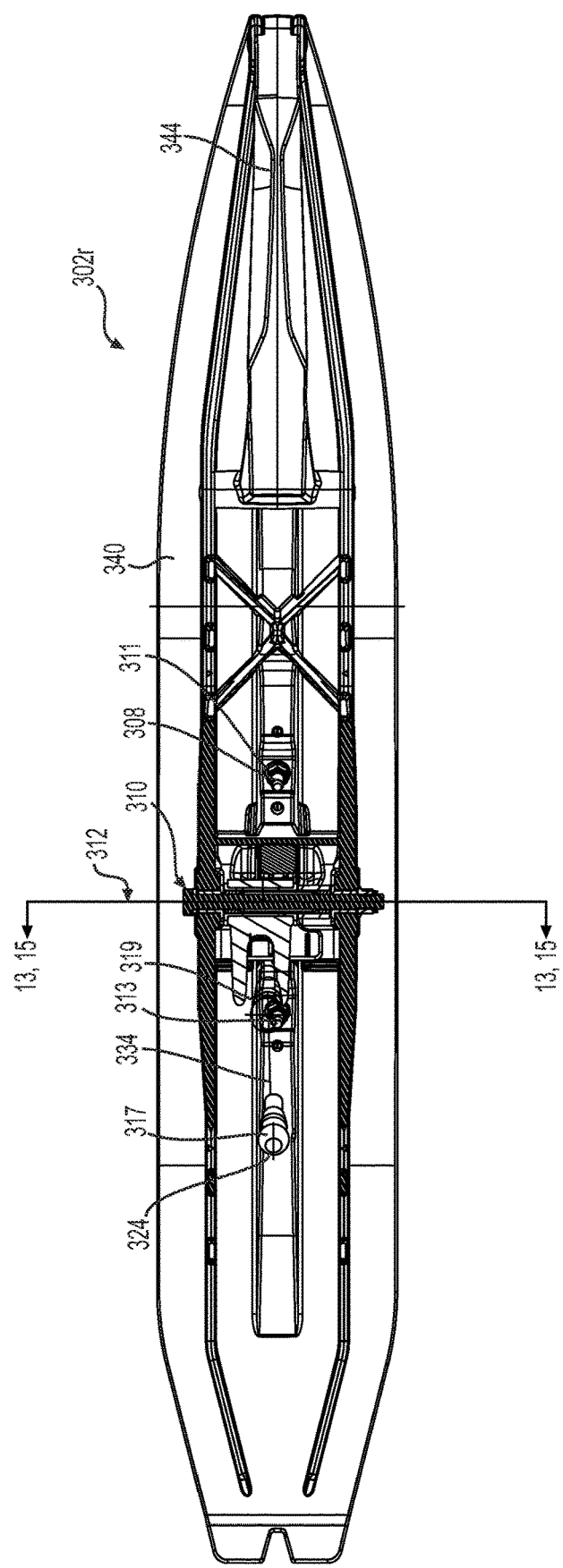
FIG. 7 is a top plan view of a right snowmobile ski being a second embodiment of the present technology.
Figure 8:
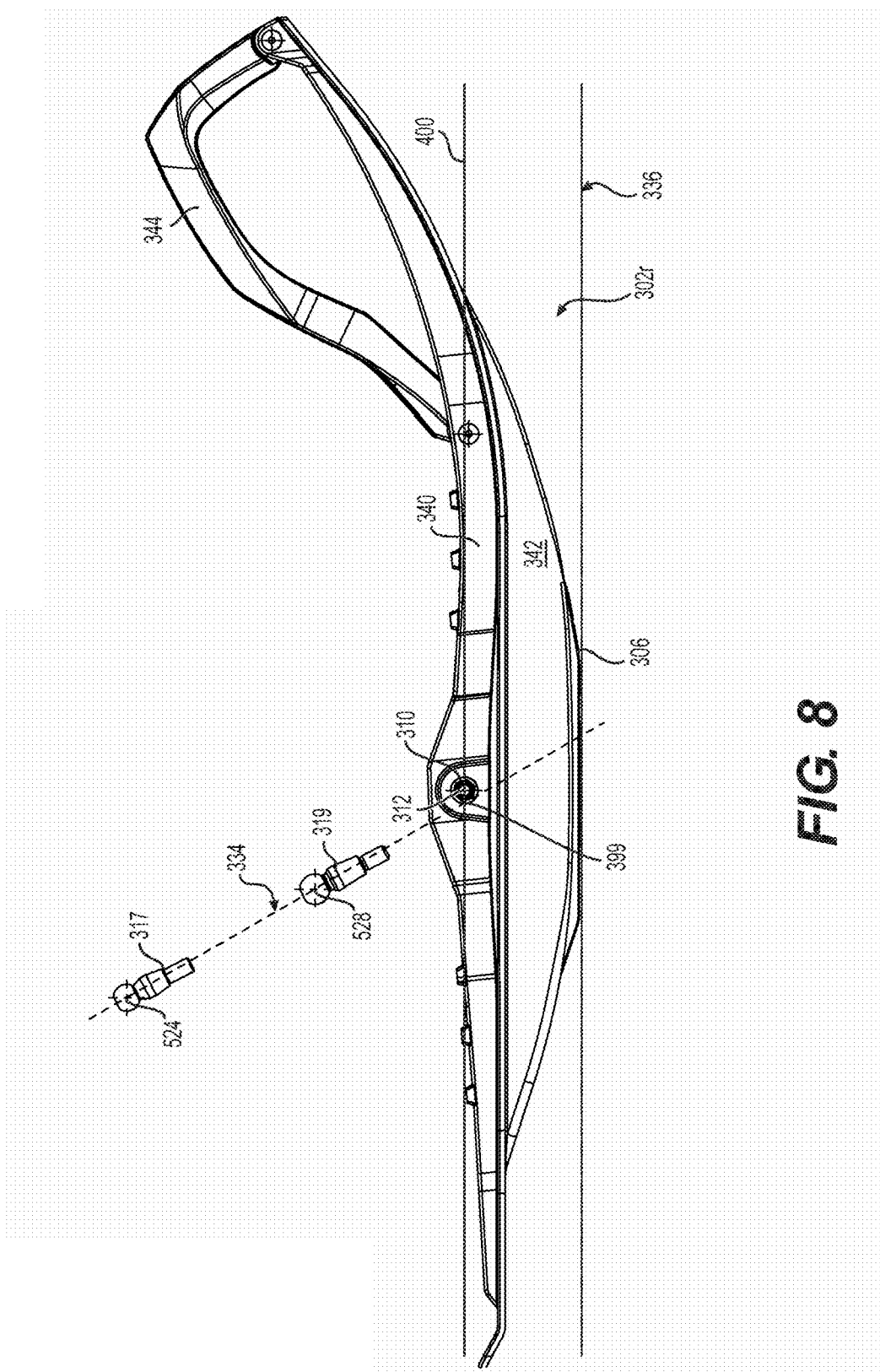
FIG. 8 is a right side elevation view of the ski of FIG. 7.
Figure 9:
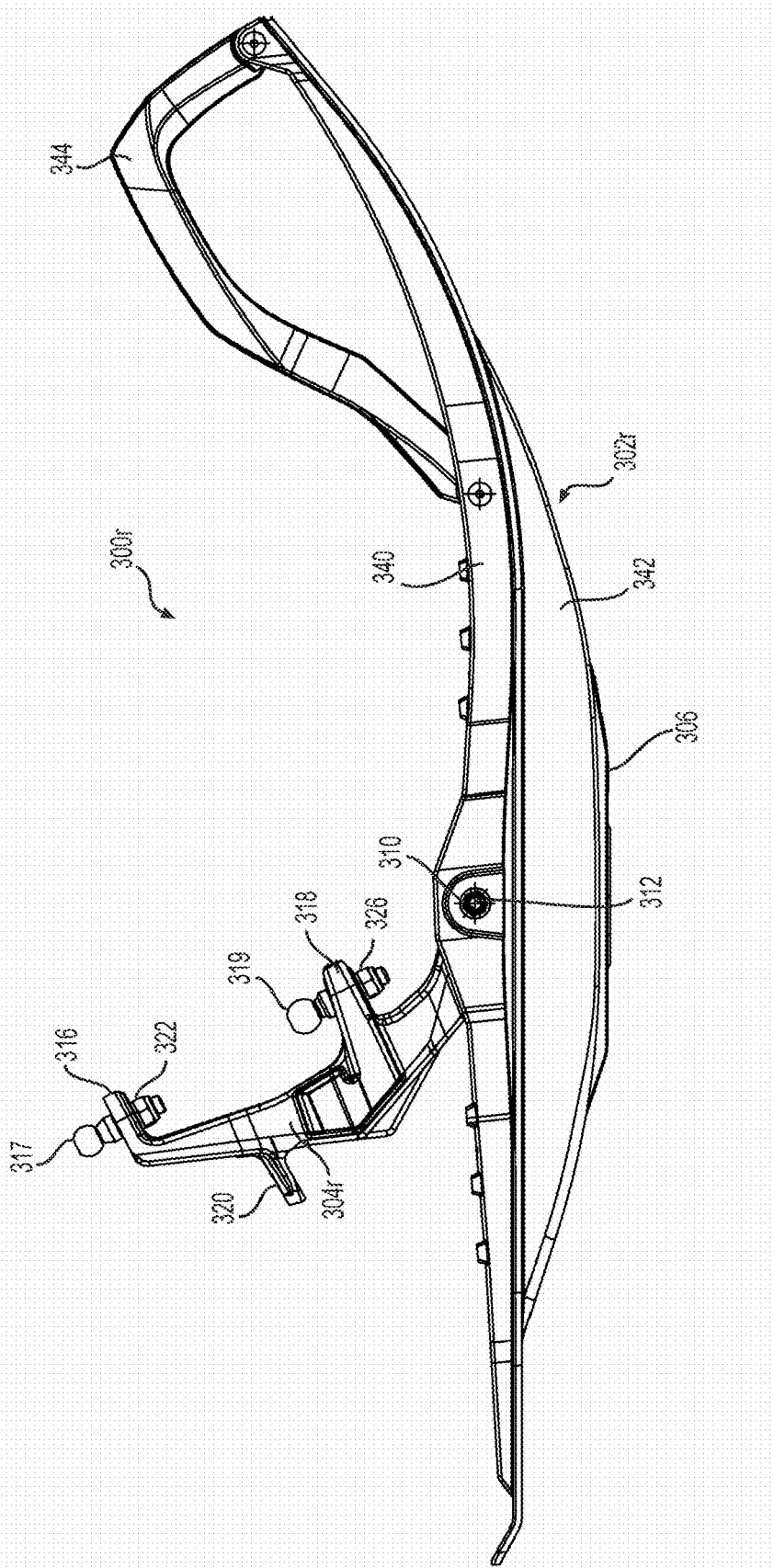
FIG. 9 is a right side elevation view of the ski of FIG. 7 shown with a ski leg.
Figure 11:
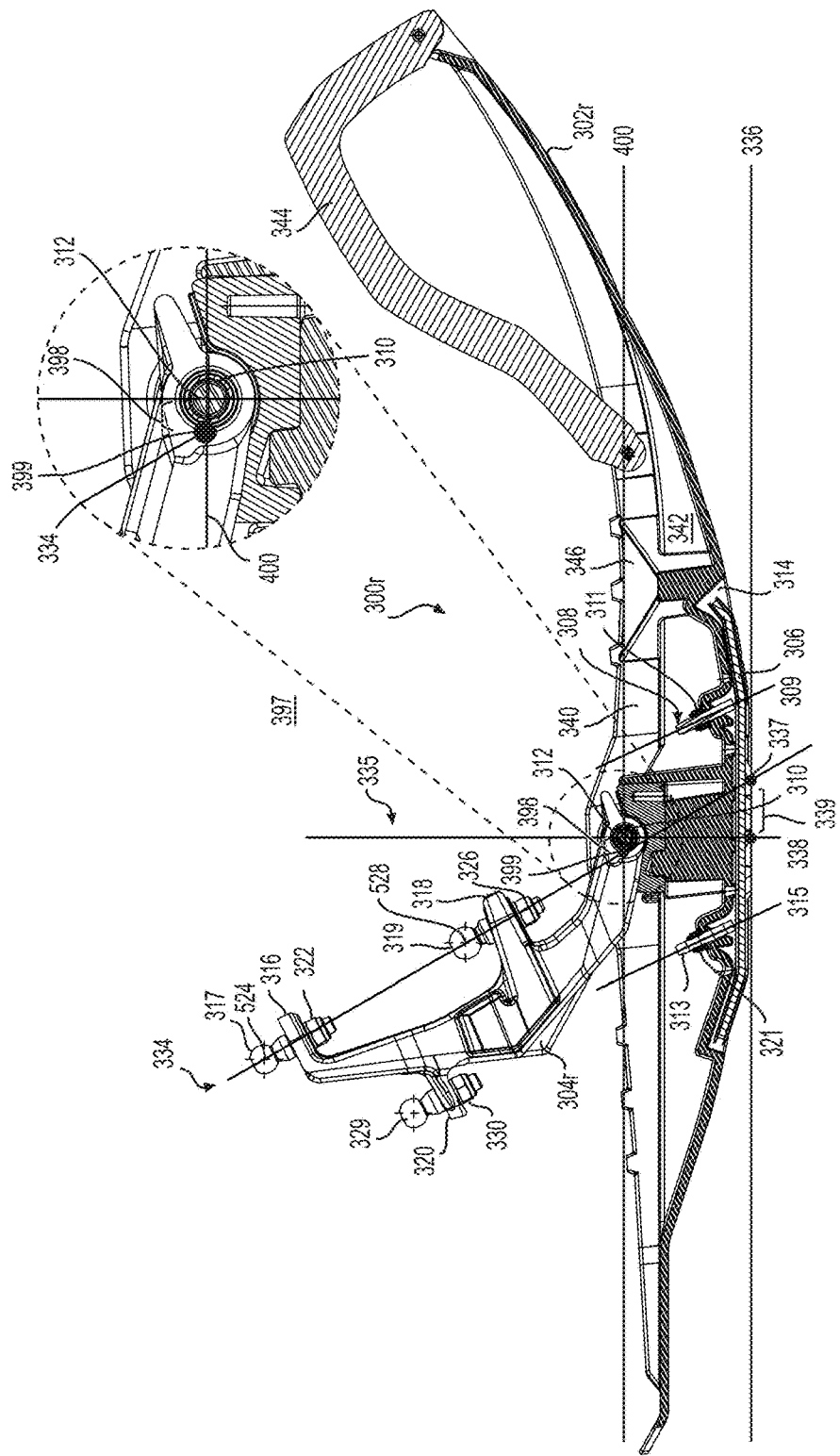
FIG. 11 is a cross-section of the ski and ski leg of FIG. 9 taken along the line 11-11 in FIG. 10.
Figure 12:
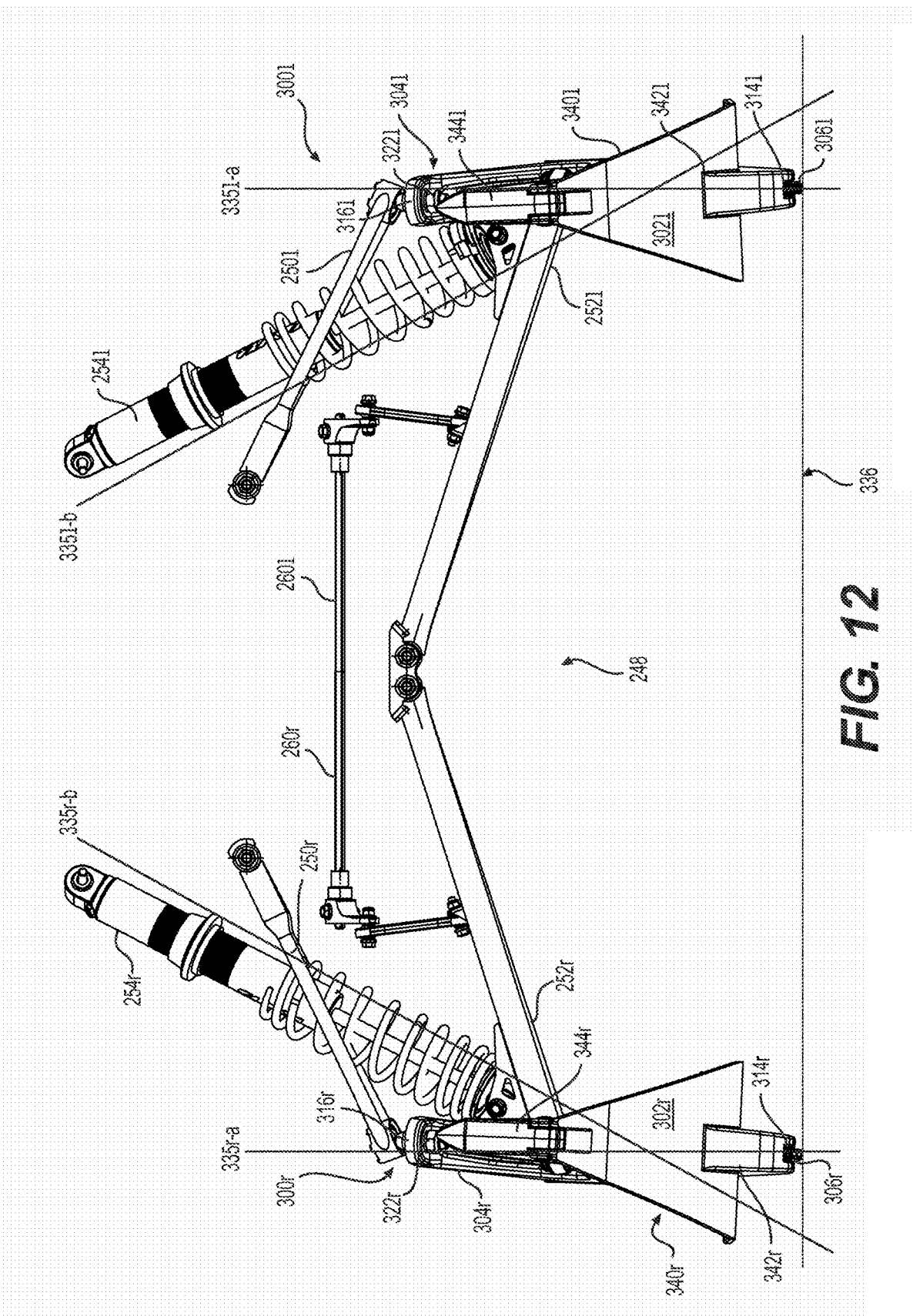
FIG. 12 is a bottom front isometric view of a portions of snowmobile front suspension assembly, steering assembly and skis including the ski of FIG. 7.

As can be seen in the FIGS. 7 and 11, the ski leg 304 is constructed such that the centers 524, 528 of the ball joints 317, 319 form the kingpin axis 334. The ball joints are positioned on ski leg 304 such that in the plane passing through the central axis 312 of the bolt 310 (which connects the ski 302 to the ski leg 304) parallel to the ground 336 when the snowmobile is steered straight on flat level terrain were the camber of the ski 302 zero (the plane is shown as line 400 in the Figures), were the ski 302 to have zero camber, the kingpin axis 334 is behind the bolt 310 by a distance 398 when viewed from the side (the intersection of kingpin axis 334 and plane 400 is shown as point 399 in FIG. 14).

Further, as can also be seen in FIG. 11, the ski leg 304 is constructed such that an intersection of the load axis 335 of the ski 302 with a bottom of the ski 302 (shown as point 338) is behind an intersection of the kingpin axis 334 with the bottom of the ski 302 (shown as point 337) by a distance 339. Thus, when the ski is operated on hard ground, the ski has a positive trail (caster). Distance 339 is greater in absolute value than distance 398.

Figure 10:
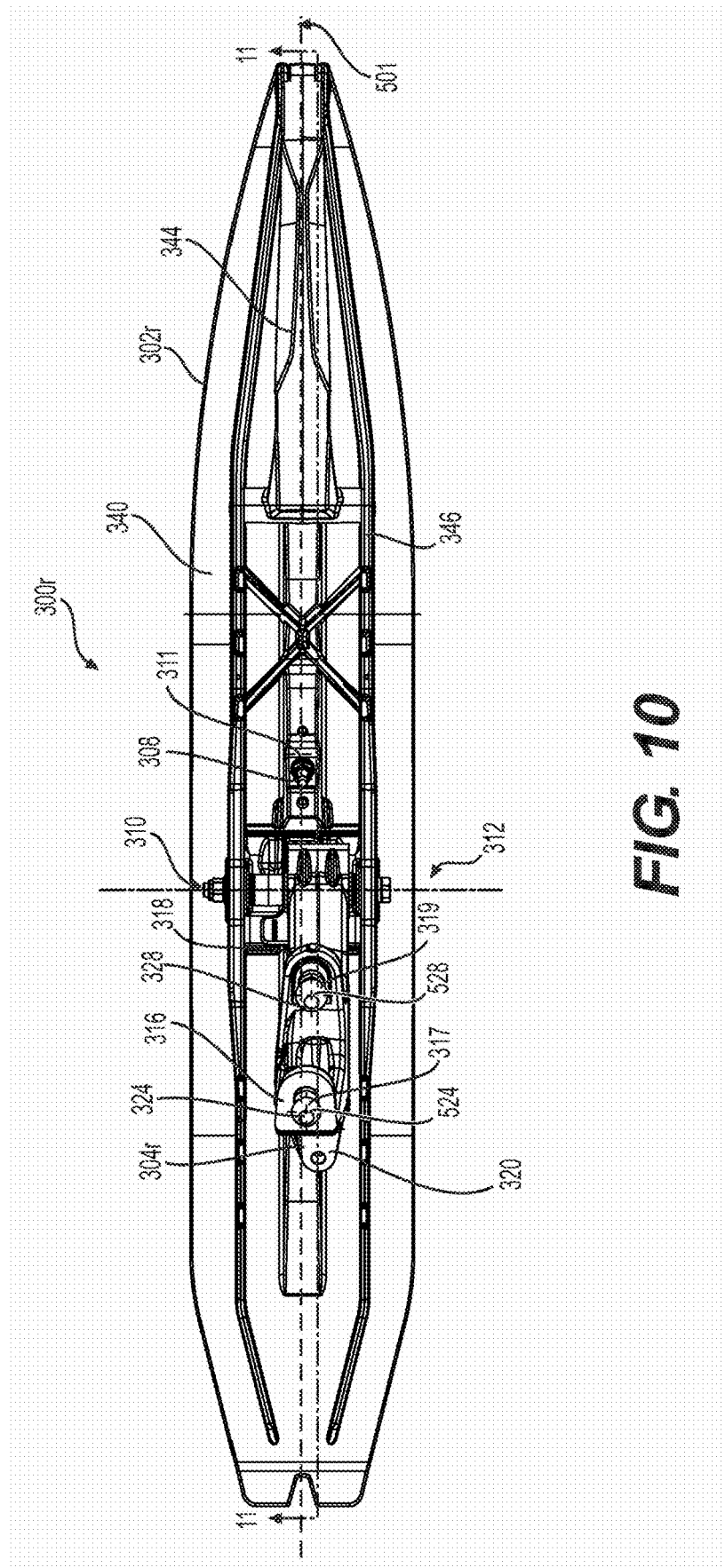
FIG. 10 is a top plan view of the ski and ski leg of FIG. 9 showing the cross-section lines for FIG. 11.

A ski longitudinal center plane is defined by the plane containing the longitudinal centerline 501 (in FIG. 10) of the ski perpendicular to the ground 336 when the snowmobile is steered straight on flat level terrain with ski 302 having zero camber. In this embodiment the ski 302 is symmetric about its longitudinal centerline 501 (in FIG. 10). (In other embodiments this is not the case and the ski 302 is asymmetric about the longitudinal centerline.) In FIG. 11, there is shown a cross-section of ski 302 taken along the line 11-11 in FIG. 10. As can be seen in FIG. 10, the cross-section of FIG. 11 is not exactly along the ski longitudinal center plane (because of the very light camber of the ski), but for ease of understanding certain aspects of the present technology, in some instances hereinbelow, the cross-section of FIG. 11 may be taken as approximating one taken along the ski longitudinal center line.

As was discussed hereinabove in relation to FIGS. 5 and 6, during side-hilling (or boon-docking) the snowmobile is tilted with respect to the ground. The ski leg 304 is constructed such when the load axis 335 is reoriented with respect to the ski 302 similarly to that shown in FIG. 4 (owing to the tilt of the snowmobile), the load axis 335 passes through the pin axis 312 in front of the king pin axis 334. Thus, in this position the snowmobile ski 302 has a negative trail, which assists in counter-steering the ski 302. (In FIG. 12, the relative positions of the load axis 335 and the ski 302 when the snowmobile is on flat hard-packed ground 336 and when the snowmobile is tilted during side-hilling are shown as 335*l*-a and 335*l*-b, respectively for the left ski 302*l* and as 335*r*-a and 355*r*-b, respectively for the right ski 302*r*. The positions of 335*l*-b and 335*r*-b have been someone exaggerated in FIG. 12 as an aid to understanding.)

The snowmobiler in FIG. 5 is side-hilling, and as such he has positioned his body on the left side of the snowmobile 11 tilting the snowmobile on its left side. Assuming that the skis on the snowmobile 11 are those of the second embodiment of the present technology (shown in FIGS. 7-16), the snowmobiles' 11 left ski 302*l* is the sole ski in contact with the snow. The snowmobiles' 11 right ski 302*r* is in the air. And both skis 302*l*, 302*r* are counter-steered and thus turned to the right (in the opposite direction from the tilt, which is to the left).

Figure 13:
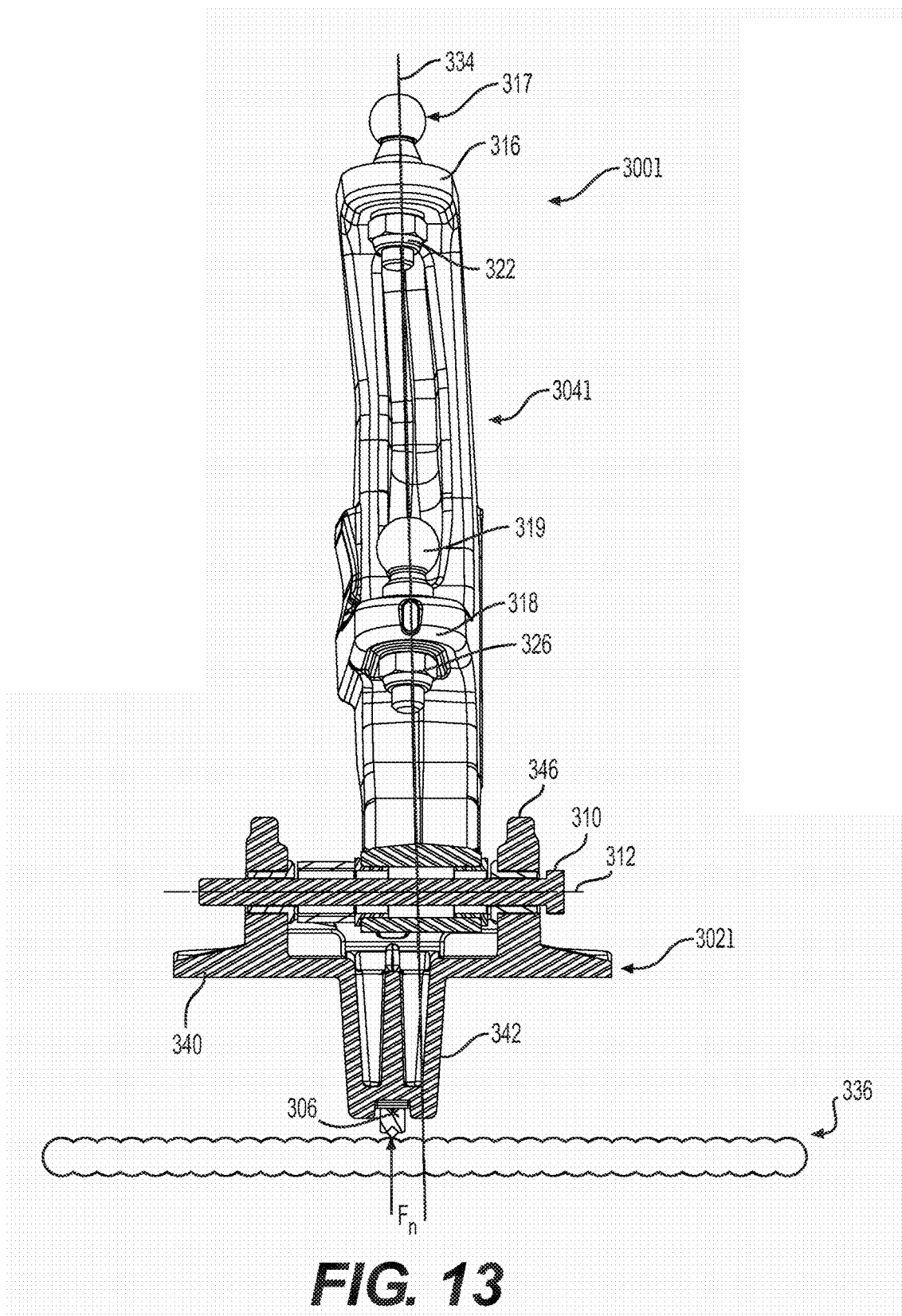
FIG. 13 is cross-section of a left snowmobile ski being a mirror image of the ski of FIG. 7, taken a long a line similar to 13-13 in FIG. 7, when the snowmobile is headed straight on flat level terrain.
Figure 14:
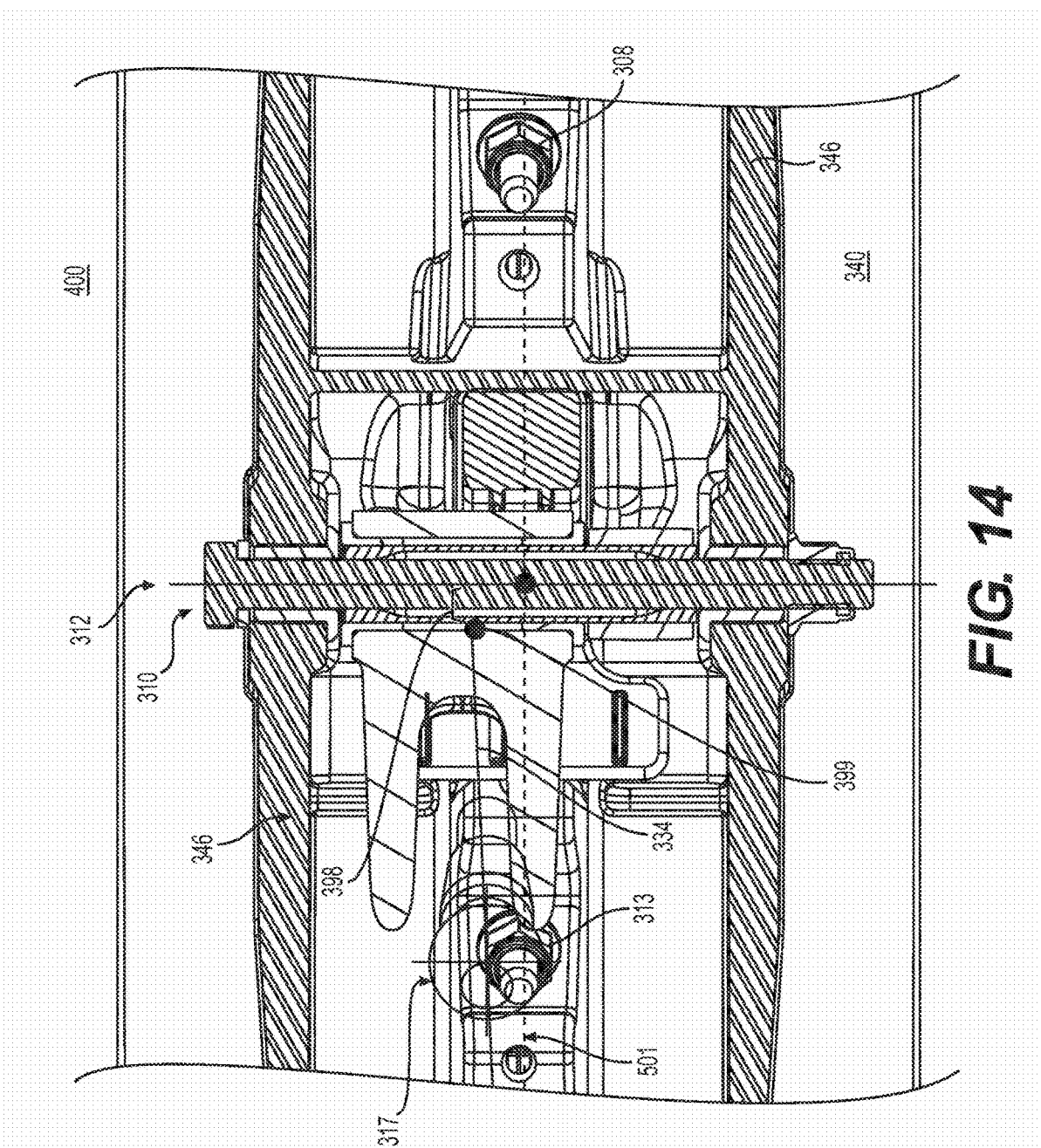
FIG. 14 is a cross-section of the ski of FIG. 13 taken along a plane perpendicular to the page of FIG. 13 containing the ski bolt axis 312

FIGS. 13-16 illustrate one effect of the tilting of the snowmobile. FIG. 13 is a cross-section of a left ski 302*l* taken on a line similar to that of line 13-13 in FIG. 7, when the snowmobile 11 is being steered straight on flat level terrain. As is shown in FIG. 13, the load axis 335 only has a vertical component (shown in FIG. 13 as $F_n$—the ground force opposing the load axis) and no lateral component with respect to the ski 302*l*. Thus, no moment about the kingpin axis 334 is created that would induce a counter-steering force upon the steering (urging the ski 302*l* to turn). As can be seen in FIG. 14, which is a cross-section of FIG. 13 through the ski bolt axis 312, the king pin axis 334 intersects this plane 400 at a point 399 which is behind the ski bolt axis 312 by a distance 398. Further this point of intersection 399 is laterally outward from the ski's 302 longitudinal center plane 501.

Figure 15:
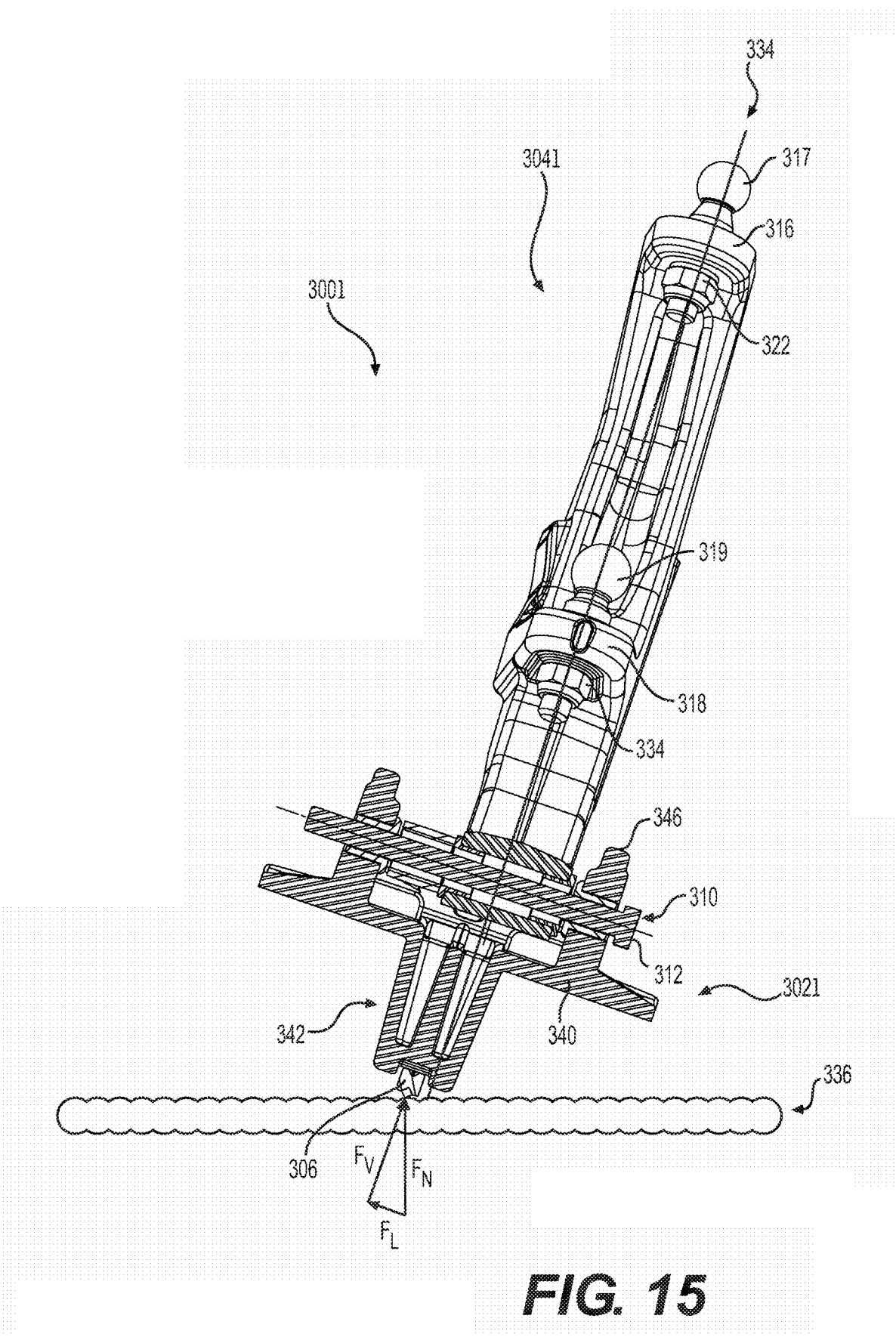
FIG. 15 is cross-section of a left snowmobile ski being a mirror image of the ski of FIG. 7, taken a long a line similar to 13-13 in FIG. 7, when the snowmobile is titled to the left.

FIG. 15, however, is a cross-section of the left ski 302*l* (of FIG. 13) taken on a line similar to that of 15-15 in FIG. 7 when the snowmobile 11 is tilted to the left as is shown in FIG. 5. As is shown in FIG. 15, the load axis 335 now has a vertical component (shown with respect to the ground force ($F_N$) opposing load on the load axis 135 in FIG. 15 as $F_v$) and a lateral component (shown with respect to the ground force ($F_N$) opposing load on the load axis 135 in FIG. 15 as $F_L$) with respect to the ski 302*l*.

Figure 16:
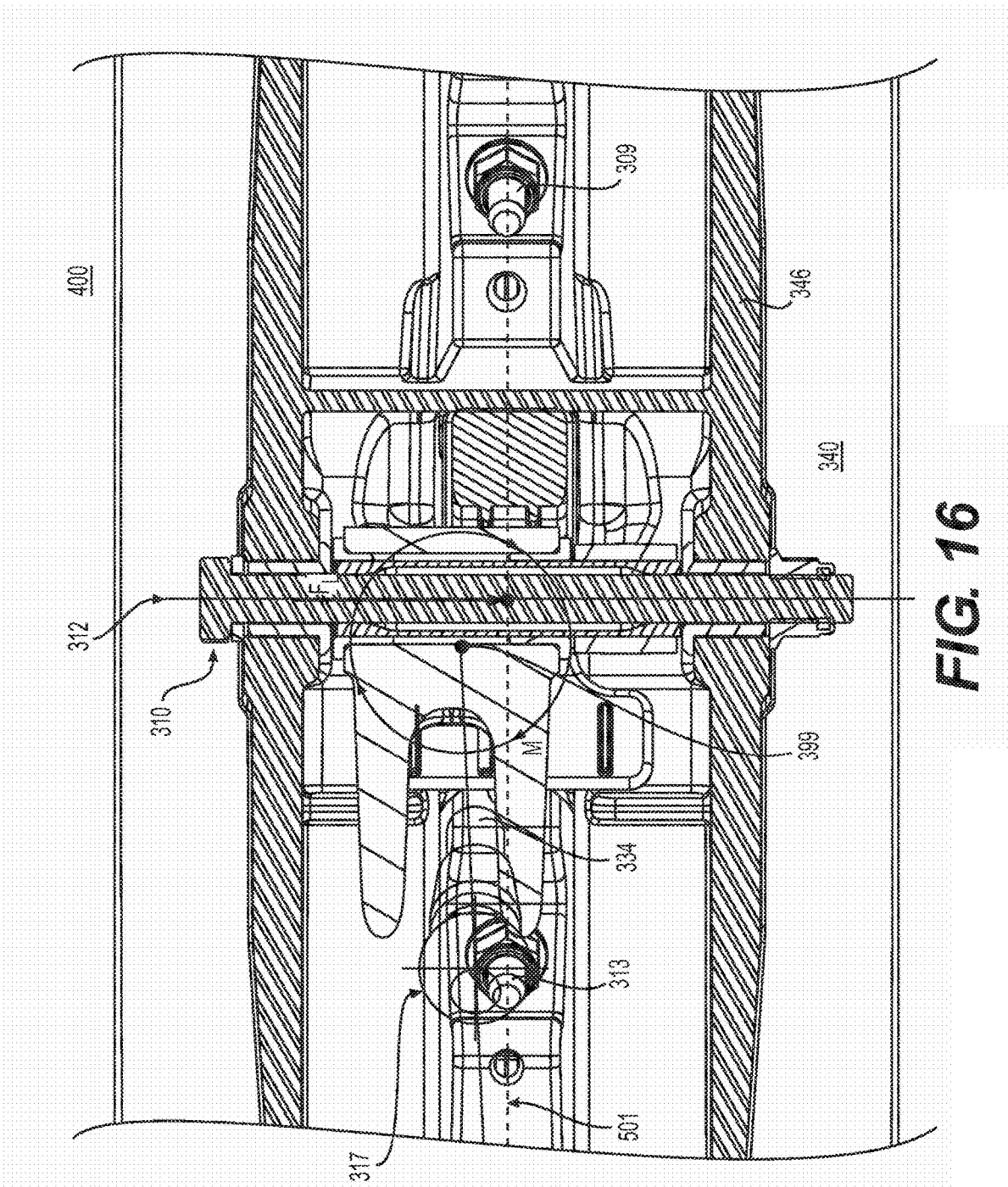
FIG. 16 is a cross-section of the ski of FIG. 15 taken along a plane perpendicular to the page of FIG. 15 containing the ski bolt axis 312.

In FIG. 16, this lateral component force ($F_L$), exerted along the bolt axis 312, creates a moment (M) about the kingpin axis 335. This moment induces a counter-steering force upon the steering (urging the ski 302*l* to "want" to turn to the right (opposite to the direction of the tilt)). The lateral component $F_L$ and the moment (M) are both shown in FIG. 16.

The ski 302 includes a ski body 340, a keel 342 disposed on the bottom of the ski body 340, and a handle 344 connected to the upturned front portion of the ski body 340. The ski body 340 and the keel 342 are made of ultra-high molecular weight (UHMW) polyethylene. It is contemplated that the ski body 340 and the keel 342 could be made of other suitable materials.

The front portion of the ski body 340 curves upwards. The middle and rear portions of the ski body 340, as seen from a side of the ski body 340, are generally flat except for a portion adjacent to the rear end that is angled upwards. As seen from above, the front and rear of the ski body 340 are tapered and the sides of the middle portion are parallel.

The ski body 340 has left and right longitudinally extending walls 346 extending upwards from an upper surface of the ski body 340. The walls 346 are laterally inwards of the lateral sides of the ski body 340. It is contemplated that the walls 346 could be disposed along the lateral sides of the ski body 340, and that they could extend more or less in the longitudinal direction than as shown in the illustrated implementation. The handle 344 is connected between the walls 346. Apertures (not shown) are defined in the walls 346 to receive the bolt 310 used to fasten the ski 302 to the ski leg 304.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

The invention claimed is:

1. A snowmobile, comprising:
a frame;
an engine disposed on the frame;
a drive track disposed below the frame and being connected operatively to the engine for propulsion of the snowmobile;
a seat disposed on the frame above the drive track and rearward of the engine;
a front left suspension assembly and a front right suspension assembly disposed on the frame, each suspension assembly including:
an upper A-arm,
a lower A-arm, and
a ski leg, the ski leg being pivotably connected to the upper A-arm via an upper A-arm connector and to the lower A-arm via a lower A-arm connector and being pivotable about a kingpin axis; and
for each of the left and right suspension assemblies:
a ski connected to the ski leg via a ski connector, the upper A-arm connector, the lower A-arm connector and the ski connector being positioned one with respect to the others such that the kingpin axis is behind the ski connector, in a plane passing through a central axis of the ski connector and parallel to the ground when the snowmobile is steered straight on flat level terrain, when the ski is viewed from a side.

2. The snowmobile of claim 1, wherein the upper A-arm connector, the lower A-arm connector and the ski connector are further positioned one with respect to the others such that an intersection of a load axis of the ski with a bottom of the ski is behind an intersection of the kingpin axis with the bottom of the ski when the ski is viewed from the side when the snowmobile is steered straight on flat level terrain.

3. The snowmobile of claim 2, wherein
the kingpin axis is behind the ski connector by a first distance, in the plane passing through the central axis of the ski connector and parallel to the ground when the snowmobile is steered straight on flat level terrain, when the ski is viewed from a side,
the intersection of the load axis of the ski with the bottom of the ski is behind the intersection of the kingpin axis with the bottom of the ski by a second distance when the ski is viewed from the side when the snowmobile is steered straight on flat level terrain, and
the first distance is less than the second distance.

4. The snowmobile of claim 1, wherein the ski leg, the upper A-arm connector, the lower A-arm connector, the ski connector and the ski are constructed and arranged such that when the snowmobile is tilted in a tilt direction in use during normal operation of the snowmobile, a lateral component of a load axis creates a moment about the kingpin axis tending to rotate the ski in a turning direction opposite the tilt direction.

5. The snowmobile of claim 2, wherein the ski leg, the upper A-arm connector, the lower A-arm connector, the ski connector and the ski are constructed and arranged such that when the snowmobile is tilted in a tilt direction in use during normal operation of the snowmobile, a lateral component of a load axis creates a moment about the kingpin axis tending to rotate the ski in a turning direction opposite the tilt direction.

6. The snowmobile of claim 3, wherein the ski leg, the upper A-arm connector, the lower A-arm connector, the ski connector and the ski are constructed and arranged such that when the snowmobile is tilted in a tilt direction in use during normal operation of the snowmobile, a lateral component of a load axis creates a moment about the kingpin axis tending to rotate the ski in a turning direction opposite the tilt direction.

7. The snowmobile of claim 1, wherein
the ski has a ski longitudinal center plane containing a longitudinal axis of the ski and being perpendicular to the ground when the snowmobile is steered straight on flat level terrain;
the ski has a ski runner secured to the ski via a forward threaded bolt having a forward bolt central axis and a rearward threaded bolt having a rearward bolt central axis; and
at least one of the forward bolt central axis and the rearward bolt central axis lies within the ski longitudinal center plane.

8. The snowmobile of claim 2, wherein
the ski has a ski longitudinal center plane containing a longitudinal axis of the ski and being perpendicular to the ground when the snowmobile is steered straight on flat level terrain;
the ski has a ski runner secured to the ski via a forward threaded bolt having a forward bolt central axis and a rearward threaded bolt having a rearward bolt central axis; and
at least one of the forward bolt central axis and the rearward bolt central axis lies within the ski longitudinal center plane.

9. The snowmobile of claim 3, wherein
the ski has a ski longitudinal center plane containing a longitudinal axis of the ski and being perpendicular to the ground when the snowmobile is steered straight on flat level terrain;
the ski has a ski runner secured to the ski via a forward threaded bolt having a forward bolt central axis and a rearward threaded bolt having a rearward bolt central axis; and
at least one of the forward bolt central axis and the rearward bolt central axis lies within the ski longitudinal center plane.

10. The snowmobile of claim 1, wherein
the ski has a ski longitudinal center plane containing a longitudinal axis of the ski and being perpendicular to the ground when the snowmobile is steered straight on flat level terrain; and
a point of intersection of (i) the plane passing through the central axis of the ski connector and parallel to the ground when the snowmobile is steered straight on flat level terrain when the ski is viewed from a side, and (ii) the kingpin axis, is laterally outward from the ski longitudinal center plane.

11. The snowmobile of claim 2, wherein
the ski has a ski longitudinal center plane containing a longitudinal axis of the ski and being perpendicular to the ground when the snowmobile is steered straight on flat level terrain; and
a point of intersection of (i) the plane passing through the central axis of the ski connector and parallel to the ground when the snowmobile is steered straight on flat level terrain when the ski is viewed from a side, and (ii) the kingpin axis, is laterally outward from the ski longitudinal center plane.

12. The snowmobile of claim 3, wherein
the ski has a ski longitudinal center plane containing a longitudinal axis of the ski and being perpendicular to the ground when the snowmobile is steered straight on flat level terrain; and
a point of intersection of (i) the plane passing through the central axis of the ski connector and parallel to the ground when the snowmobile is steered straight on flat level terrain when the ski is viewed from a side, and (ii) the kingpin axis, is laterally outward from the ski longitudinal center plane.

13. The snowmobile of claim 1, wherein the upper A-arm connector, the lower A-arm connector and the ski connector are positioned one with respect to the others such that the kingpin axis is behind the ski connector, in the plane passing through the central axis of the ski connector's central axis and parallel to the ground when the snowmobile is steered straight on flat level terrain were the ski to have zero camber, when the ski is viewed from a side.

14. The snowmobile of claim 13, wherein
the kingpin axis is behind the ski connector by a first distance, in the plane passing through the central axis of the ski connector and parallel to the ground when the snowmobile is steered straight on flat level terrain were the ski to have zero camber, when the ski is viewed from a side,
the intersection of the load axis of the ski with the bottom of the ski is behind the intersection of the kingpin axis with the bottom of the ski by a second distance when the ski is viewed from the side when the snowmobile is steered straight on flat level terrain, and
the first distance is less than the second distance.

15. The snowmobile of claim 13, wherein
the ski has a ski longitudinal center plane containing a longitudinal axis of the ski and being perpendicular to the ground when the snowmobile is steered straight on flat level terrain were the ski to have zero camber;
the ski has a ski runner secured to the ski via a forward threaded bolt having a forward bolt central axis and a rearward threaded bolt having a rearward bolt central axis; and
at least one of the forward bolt central axis and the rearward bolt central axis lies within the ski longitudinal center plane.

16. The snowmobile of claim 14, wherein
the ski has a ski longitudinal center plane containing a longitudinal axis of the ski and being perpendicular to the ground when the snowmobile is steered straight on flat level terrain were the ski to have zero camber;
the ski has a ski runner secured to the ski via a forward threaded bolt having a forward bolt central axis and a rearward threaded bolt having a rearward bolt central axis; and
at least one of the forward bolt central axis and the rearward bolt central axis lies within the ski longitudinal center plane.

17. The snowmobile of claim 13, wherein
the ski has a ski longitudinal center plane containing a longitudinal axis of the ski and being perpendicular to the ground when the snowmobile is steered straight on flat level terrain were the ski to have zero camber; and
a point of intersection of (i) the plane passing through the central axis of the ski connector and parallel to the ground when the snowmobile is steered straight on flat level terrain were the ski to have zero camber when the ski is viewed from a side, and (ii) the kingpin axis, is laterally outward from the ski longitudinal center plane.

18. The snowmobile of claim 14, wherein
the ski has a ski longitudinal center plane containing a longitudinal axis of the ski and being perpendicular to the ground when the snowmobile is steered straight on flat level terrain were the ski to have zero camber; and
a point of intersection of (i) the plane passing through the central axis of the ski connector and parallel to the ground when the snowmobile is steered straight on flat level terrain were the ski to have zero camber when the ski is viewed from a side, and (ii) the kingpin axis, is laterally outward from the ski longitudinal center plane.

* * * * *

UNITED STATES PATENT AND TRADEMARK OFFICE
CERTIFICATE OF CORRECTION

PATENT NO. : 10,435,059 B2
APPLICATION NO. : 15/570503
DATED : October 8, 2019
INVENTOR(S) : Bertrand Mallette et al.

It is certified that error appears in the above-identified patent and that said Letters Patent is hereby corrected as shown below:

In the Claims

Claim 13, Column 15, Lines 27-28, "...the central axis of the ski connector's central axis and parallel..." should read --the central axis of the ski connector and parallel--.

Signed and Sealed this
Seventeenth Day of November, 2020

Andrei Iancu
*Director of the United States Patent and Trademark Office*